United States Patent [19]

Takahashi et al.

[11] Patent Number: 5,546,404
[45] Date of Patent: Aug. 13, 1996

[54] INPUT/OUTPUT PORT FAULT DIAGNOSING DEVICE

[75] Inventors: Kenichi Takahashi, Toyohashi; Yoshikazu Naito, Toyokawa, both of Japan

[73] Assignee: Minolta Camera Kabushiki Kaisha, Osaka, Japan

[21] Appl. No.: 155,928

[22] Filed: Nov. 22, 1993

[30] Foreign Application Priority Data

Nov. 27, 1992 [JP] Japan ................................. 4-318768

[51] Int. Cl.⁶ ................................................ G01R 31/28
[52] U.S. Cl. ................................. 371/22.1; 355/203
[58] Field of Search ........................ 371/15.1, 22.1; 355/203; 340/517, 520, 801; 324/527, 606; 326/124

[56] References Cited

U.S. PATENT DOCUMENTS 4,053,794  10/1977  Edwards ................... 326/124
5,239,547  4/1993  Tomiyama ................ 371/15.1
5,295,141  3/1994  Person ....................... 371/15.1
5,317,368  5/1994  Shimomura et al. ...... 371/15.1

FOREIGN PATENT DOCUMENTS 3-191654  8/1991  Japan .

Primary Examiner—Emanuel T. Voeltz
Assistant Examiner—Thomas Peeso
Attorney, Agent, or Firm—Brinks Hofer Gilson & Lione

[57] ABSTRACT

A port diagnosing device capable of diagnosing normal or abnormal ports provided with a single input terminal and a plurality of output terminals comprising a signal generator for outputting predetermined signals to an optional output terminal from among a plurality of output terminals, a feedback signal for feeding back to the single input terminal predetermined signals output from the signal generator, and determining changes detected in the level of the signal fed back to the input terminal in correspondence to changes in the level of the predetermined signal, and determining the normal or abnormal operation of the optional output terminal.

9 Claims, 22 Drawing Sheets

INPUT/OUTPUT PORT FAULT DIAGNOSING DEVICE

BACKGROUND OF THE INVENTION

FIELD OF THE INVENTION

The present invention relates to an input port fault diagnosing device which determines the proper operation or abnormal operation of an input port receiving detection signals from sensors and the like so as to determine whether or not said input port has faulted, and further relates to an output port fault diagnosing device which determines the proper operation or abnormal operation of an output port transmitting control signals under load so as to determine whether or not said output port has faulted.

DESCRIPTION OF THE RELATED ART

In conventional devices for executing various types of controls by means of central processing units (hereinafter referred to as "CPU"), signals transmitted from sensors, switches and the like are input to the CPU via input ports. An example of the connection arrangement of said input ports and the periphery of said input ports is shown i n FIG. 1.

As shown in FIG. 1, a connector 401 is provided at the input port 405 for connecting the switch 402 or sensor 403 or similar detection device. An integrated circuit (IC) 400 is connected to the CPU 406 so as to be disposed medially to the CPU 406 and switch 402 or medially to the CPU 406 and sensor 403 to control the signal direction and the reception timing. A protective circuit 404 is provided medially to the connector 401 and the IC 400 to protect said IC 400 from electrical noise. In general, the IC 400 of the input port 405 functions in correspondence with multiple system signal input, and is connected to a plurality of detection devices via the protection circuit 404 and connector 401 provided to each separate system. FIG. 1 illustrates a situation wherein signal input is from two systems for the sake of simplifying the description.

In the present invention, signals are received independently via the respective connectors of the input ports. Input pins are defined as the respective terminals which function to transmit signals to the CPU through the IC. The input ports are provided with a plurality of input terminals which are individual and distinct.

The output ports for transmitting signals from the CPU to the load are constructed identically to the input ports. Output terminals are defined as the respective terminals which function to independently transmit via the various connectors of the output port the signals from the CPU through the IC. The output ports are provided with a plurality of output terminals which are individual and distinct. A detailed description of the input port follows hereinafter.

FIG. 2 is a circuit diagram of the periphery of the CPU when a plurality of sensors are connected to the input port in the image forming apparatus of copying machines and the like. On the circuit board 500 is provided a CPU 200 for controlling the various parts of the copying machine, and an input expansion I/O port 201 having a plurality of input terminals Pn (n=1, 2, . . . , N), which are mutually connected by a data bus and a control bus. The sensor S1 is connected to the input terminal P1 of the expansion I/O port 201, and the other sensors S2 through Sn are similarly connected to the respective input terminals P2 through Pn. FIG. 2 shows the connections of only two sensors for the sake of simplifying the illustration.

The signals transmitted from the sensors to the input terminals are input to the CPU 200 via the expansion I/O port 201 and data bus. The expansion I/O port 201 of FIG. 2 corresponds to the input port 405 of FIG. 1.

In FIG. 1, electrical noise is produced in the distribution area disposed medially to the connector 401 and the switch 402 or sensor 403. When the signal voltage input to the connector 401 exceeds a predetermined voltage level, the increase portion of the signal voltage (noise-induced portion) may not be absorbed by the protection circuit 404, thereby destroying the IC 400 and damaging the input port 405.

For example, when the input terminal connected to the switch 402 fails, the signal level input to the CPU 406 remains unchanging even when the level of the signal input to the input terminal (either high (H) or low (L) level) changes via the ON?OFF switching of the switch 402. Furthermore, when the switch 402 or sensor 403 fails, the level of the signals input to the CPU 406 does not change,the output and signals are signals of a level other than the normal signal output levels.

The technology for detecting the previously described failure of the input port or failure of switches and the like is well known. For example, (referring to FIG. 2) when, in correspondence with the level of a signal (high level (H) or low level (L) signal) transmitted from the switch S1 to the input port 201, the level of the signal input to the CPU 200 from the input port 201 is compared to a signal level previously stored in an internal memory of the CPU 200, a determination is made that both the switch S1 and the input port 201 have failed when said comparison of said signal levels discloses said data are mutually dissimilar.

In the aforesaid fault detection method, however, it is unclear as to whether the failure pertains to switch S1 or the input port 201, and the specific location of said fault cannot be determined. It is therefore necessary to inspect the switch S1 and the input port 201 with testing equipment during maintenance procedures, which disadvantageously increases maintenance work.

Accordingly, in order to eliminate the previously described disadvantages, a self-diagnosis method discloses that when the signal output differs from a normal value, first a determination is made as to whether or not the input port has failed, and when said input port is not damaged determines that the sensor or switch is damaged, thereby specifying the location of the fault.

In the aforesaid self-diagnosis method, signals are output from the CPU 410 to the output terminal c of the output port 411, and again input to the CPU 410 via the input terminal b of the input port 412, as shown in FIG. 3. For example, when a high (H) level signal is output from the output terminal c, and a corresponding high (H) level signal is input to the CPU 410 from the input terminal b, both the input port 412 and the output port 411 are deemed to be functioning normally, whereas when a corresponding low (L) level output signal is input to the CPU 410 from the input terminal b, both the input port 412 and the output port 411 are deemed to have failed.

In the aforesaid diagnosis method, the control signals for diagnosis do not pass through the input terminal a to accomplish said diagnosis. Therefore, failure of the input port 412 can be detected when the input terminal a and input terminal b are both damaged, but failure of the input terminal a cannot be detected when only the input terminal a has failed.

Further, in the aforesaid diagnosis method, the input terminal b must be provided for the dedicated detection of a failure of the input port, thereby having the disadvantage of reducing the efficient use of the input terminals.

SUMMARY OF THE INVENTION

An object of the present invention is to eliminate the previously described disadvantages by providing an input/output port diagnosing device which is highly efficient in using I/O terminals for diagnosis and specifies the failed input terminal and output terminal.

Accordingly, the present invention provides the following constructions.

(1) A port diagnosing device capable of diagnosing normal or abnormal ports provided with a single input terminal and a plurality of output terminals, said port diagnosing device comprising:

a signal generating means for outputting predetermined signals to an optional output terminal from among said plurality of output terminals;

a feedback means for feeding back to said single input terminal predetermined signals output from said signal generating means; and determination means for detecting changes in the level of the signal fed back to said input terminal in correspondence to changes in the level of said predetermined signal, and determining the normal or abnormal operation of said optional output terminal.

A further invention provides the following construction.

(2) A port diagnosing device capable of diagnosing normal or abnormal ports provided with a single output terminal and a plurality of input terminals, said port diagnosing device comprising:

a signal generating means for generating predetermined signals to said output terminal;

a feedback means for feeding back to an optional input terminal predetermined signals output from said signal generating means; and a determination means for detecting changes in the level of signals fed back to said optional input terminal in accordance with changes in the level of said predetermined signals, and determining the normal or abnormal operation of said optional output terminal.

DETAILED DESCRIPTION OF THE PREFERRED EMBODIMENTS

First Embodiment

Figure 4:
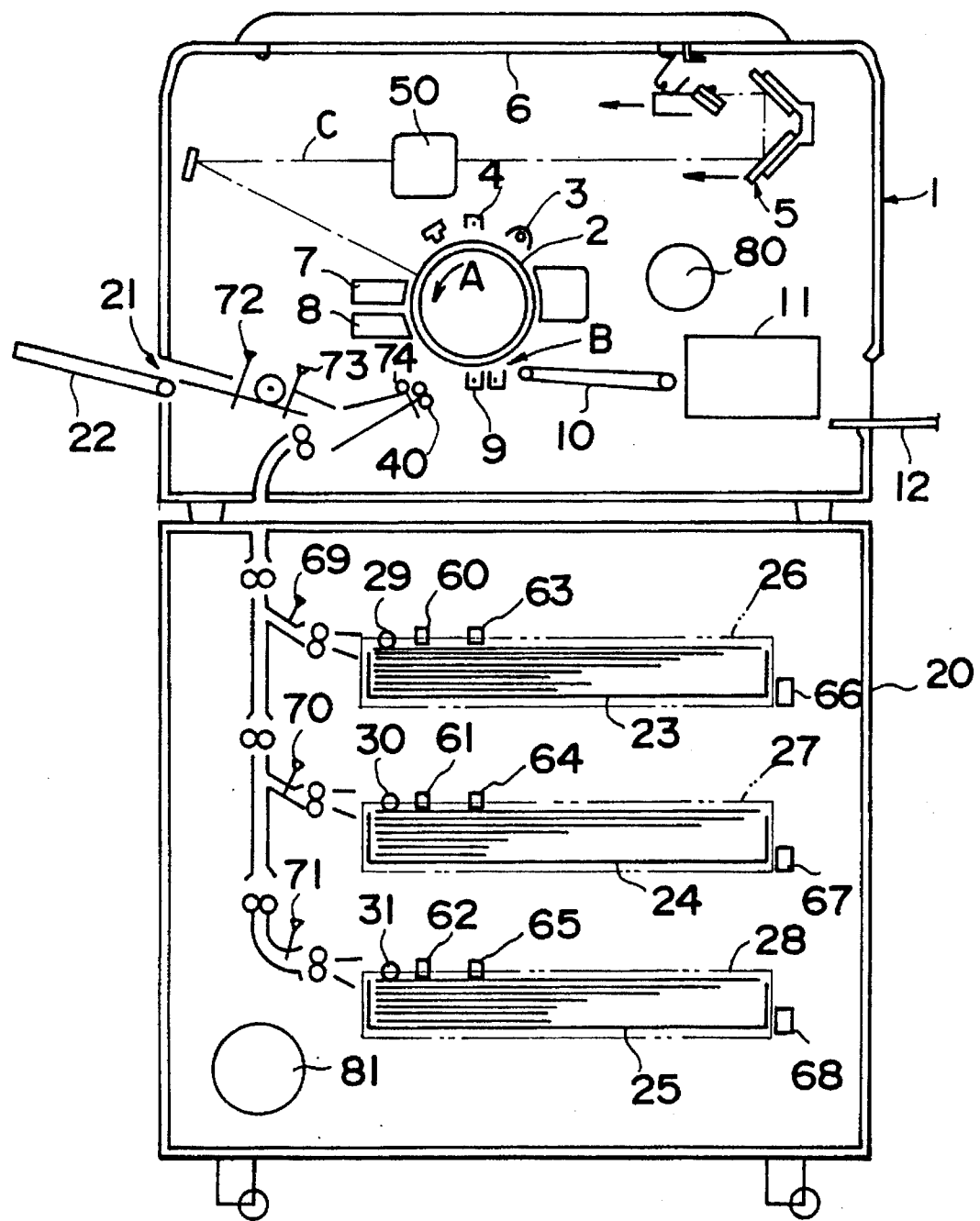
FIG. 4 is a section view showing the construction of a copying apparatus using an embodiment of the present invention.

FIG. 4 is a section view showing the general construction of an image forming apparatus using a first embodiment of the present invention. The construction and operation of the aforesaid image forming apparatus is described hereinafter with reference to FIG.

The apparatus body 1 is disposed on a paper supply unit 20 and has centrally disposed therein a photosensitive drum 2. The photosensitive drum 2 is rotatably driven in the arrow A direction in the drawing. The residual charge on the surface of the photosensitive drum 2 is eliminated via the eraser lamp 3, and thereafter a uniform charge is applied thereto via the charger 4. The image of an original document disposed at a predetermined position on the document platen 6 provided on the top of the apparatus body 1 is exposed on the charged surface of the photosensitive drum 2 via the exposure optical system 5, thereby forming an electrostatic latent image on the surface of the photosensitive drum 2 corresponding to the aforesaid original image. The electrostatic latent image is then developed by either the developing unit 7 or developing unit 8, thereby forming a developed image.

On the other hand, a transfer sheet manually fed from the manual feed inlet 21 provided on the apparatus body 1, or a transfer sheet fed from one of the paper cassettes 23, 24 or 25 provided within the paper supply unit 20 are transported in the transfer section B opposite the transfer charger 9. The developed image formed on the surface of the photosensitive drum 2 is transferred via the transfer charger 9 onto the transfer sheet transported to the transfer section B. After the aforesaid transfer, the transfer sheet is separated form the photosensitive drum 2, and is subsequently transported via a transport belt 10 of the suction type to the fixing device 11 whereupon the image on said transfer sheet is fixed, and discharged to a discharge tray 12 provided outside the apparatus body 1.

A manual feed table 22 is provided at the manual feed inlet 21 so as to guide the manually fed transfer sheet. The paper cassettes 23, 24 and 25 are removably installed in the cassette loading ports 26, 27 and 28, respectively, provided within the paper supply unit 20. A transfer sheet can be fed from a desired paper cassette by selectively driving the feed rollers 29, 30 or 31. The aforesaid desired transfer sheet is fed to the transfer section B synchronously with the electrostatic latent image formed on the surface of the photosensitive drum 2 via the timing roller The exposure optical system 5 is a mirror-scanning type system, capable of variable copy magnification by moving the projection lens 50 in the direction of the optical axis C. The first slider 54, which is provided with an exposure light source 52 and a first mirror 53, moves in the scanning operation at a speed V/m (where V is the circumferential speed of the photosensitive drum, and m is the copy magnification), and the second slider 67, which is provided with second and third mirrors 65 and 66, moves at a speed V/2 m so as to maintain a constant length of the optical path in accordance with each magnification during scanning.

The paper supply unit 20 is provided with sensors 60, 61 and 62 for detecting the presence and absence of transfer sheets within the paper cassettes 23, 24 and 25, respectively, sensors 63, and 65 for detecting the remaining quantity of transfer sheets accommodated within said paper cassettes 23, 24 and 25, respectively, and sensors 66, 67 and 68 for detecting the size of the transfer sheet accommodated in said paper cassettes 23, 24 and 25, respectively. Sensors 69, 70 and 71 are further provided to detect when a transfer sheet is fed from the paper cassettes 23, 24 and 25, respectively.

The manual feed inlet 22 on the apparatus body 1 is provided with a manual feed sensor 72 to detect a manually fed transfer sheet, and a manual feed sensor 73 to detect the transport of a manually fed transfer sheet. A sensor 74 is also provided to detect the passage immediately anterior to the timing roller 40 of a transfer sheet fed from the aforesaid paper cassettes 23, 24 or 25 or the manual feed inlet 21. When the sensor 74 detects a transfer sheet, the timing roller 40 is turned ON with a predetermined timing.

A main motor 80 is provided in the apparatus body 1 to drive the copying mechanisms, and a paper supply motor 81 is provided to drive the paper supply mechanisms of the paper supply unit 20.

Figure 5:
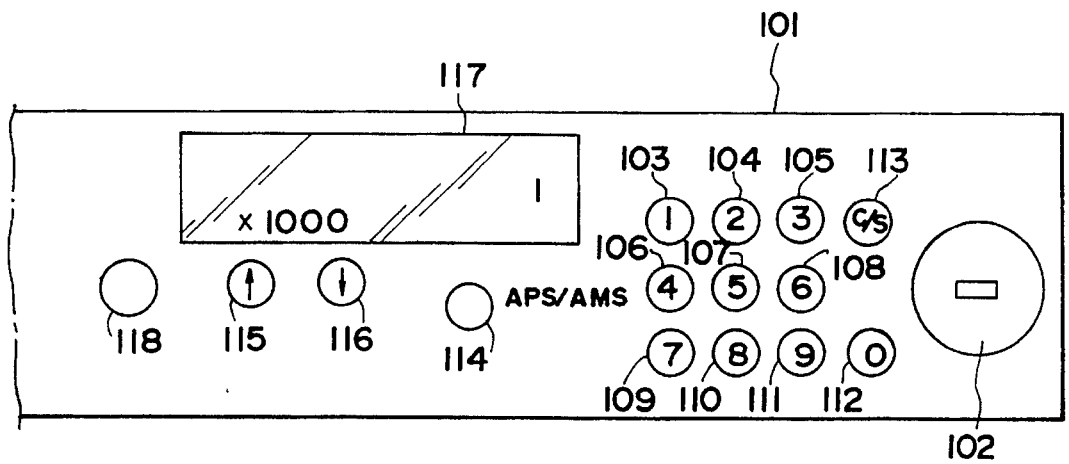
FIG. 5 is an illustration showing the construction of the control panel provided on the copying apparatus of FIG. 1.

The operation panel 101 is provided on the top of the apparatus body 1, as shown in FIG. 5. On the operation panel are located a print key 102 for starting the copy process, a ten-key pad comprising numerical input keys 103~112 for entering numerals 1 through 0, clear/stop key 113 for clearing the copy number and stopping the copy operation, mode selection key 114 for selecting either an automatic paper selection mode (APS), an automatic copy magnification selection mode (AMS), or manual mode, magnification increment key 115 for incrementing copy magnification, magnification decrement key 116 for decrementing copy magnification, Liquid Crystal Display (LCD) 117 for displaying various types of information on setting magnification, number of copies, and displaying various memory cells, and I/O diagnostic key 118 for diagnosing the expansion I/O port described later. The I/O diagnostic key 118 may be provided within the image forming apparatus so as to prevent casual use by an operator.

Figure 6:
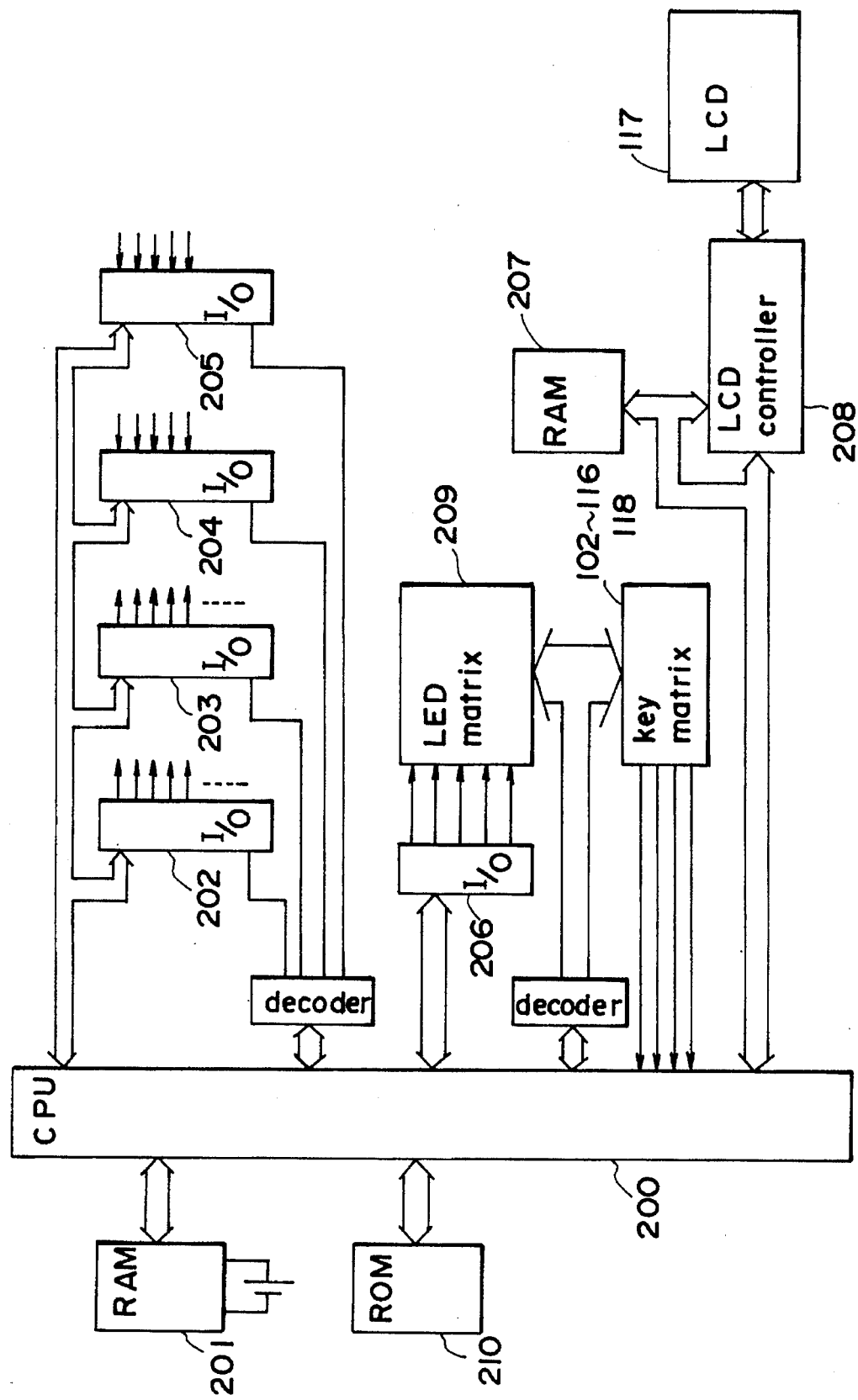
FIG. 6 is a block diagram showing the control of the copying apparatus of FIG. 1.

FIG. 6 is a block diagram showing the peripheral circuit construction of the CPU in the image forming apparatus of FIG. 4. With the CPU 200 at the core, peripheral devices comprise random access memory (RAM) 201 for storing the data required for port diagnosis, read only memory (ROM) 210 for storing programs which execute the copy operation process and port diagnosis process, output expansion I/O port 202 for outputting signals to the main motor 80 and paper feed motor 81, output expansion I/O port 203 for outputting signals to other loads, input expansion I/O port 204 for inputting signals from each sensor, input expansion I/O port 205 for inputting signals from other detection devices, output expansion I/O port 206 for lighting the LED of the operation panel, and RAM 207 for storing the data displayed on said LCD. The CPU 200 writes the display data to the RAM 207, and the contents of RAM 207 are displayed on the LCD 117 via the LCD controller 208.

Figure 7:
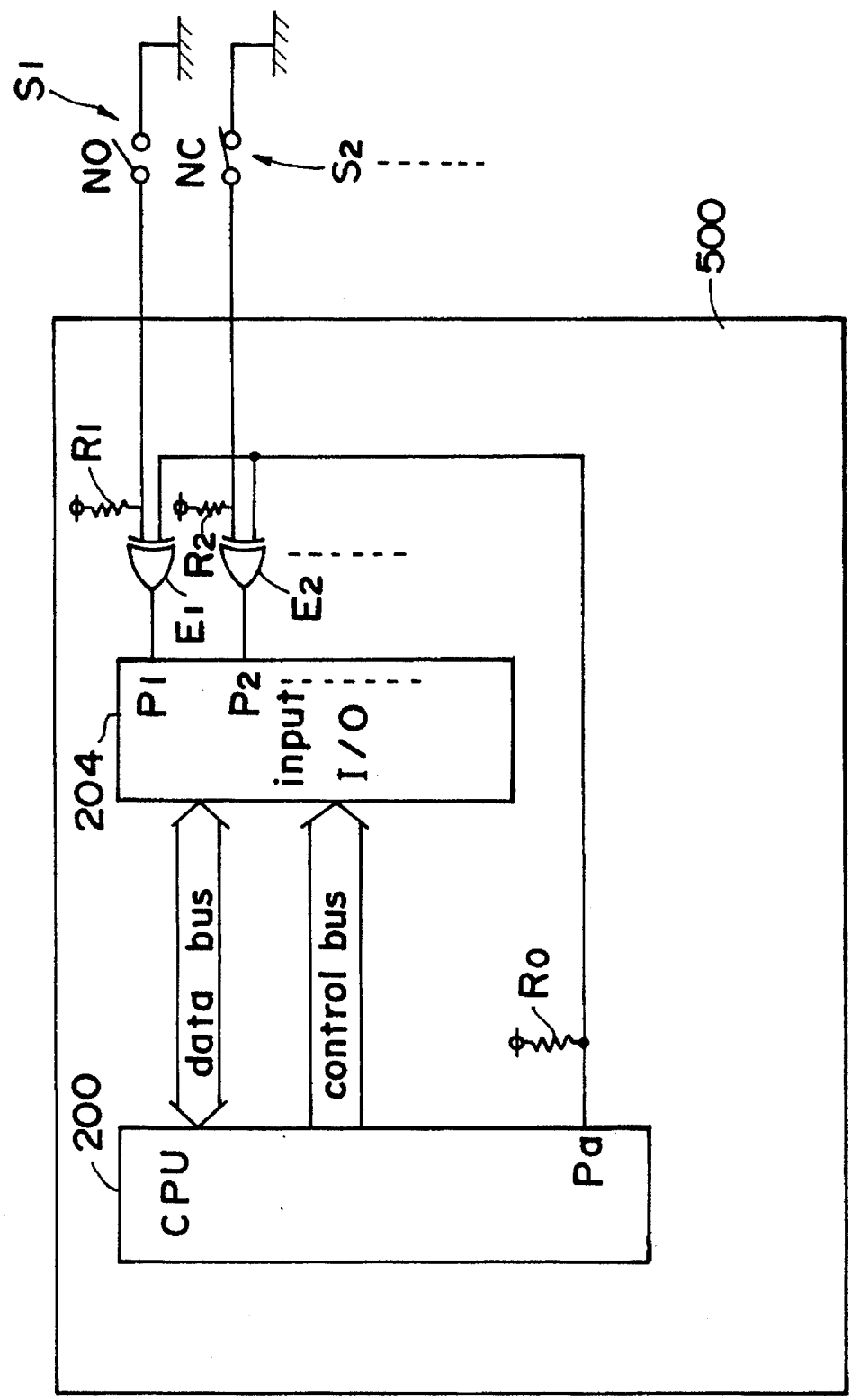
FIG. 7 shows the construction of the input terminal fault diagnosing circuit for diagnosing the expansion I/O port 204 used for input shown in FIG. 6.

FIG. 7 shows an example of an input port diagnostic circuit for diagnosing the input expansion I/O port 204 shown in FIG. 6. This circuit comprises the CPU 200, input expansion I/O port 204, and a plurality of sensors S1~Sn (where N≧2). FIG. 7 shows a situation with two sensors for the sake of simplifying the illustration. The input port diagnostic circuit construction is described in detail hereinafter.

The CPU 200 and the expansion I/O port 204 are mutually connected via a data bus and a control bus. The sensors Sn (where n=1, 2, . . . , N) are not directly connected to the expansion I/O port 204, but are connected in parallel to the pull-up resistors Rn at one end of the input terminal of the exclusive-OR gates En. The output terminal of the exclusive-OR gates En is connected to the input terminal Pn of the expansion I/O port 204. The other input terminals of the exclusive-OR gate El~En are combined in a single input terminal via connector leads, which is connected to the output terminal Pa of the CPU 200 in parallel with the pull-up resistor R0. The pull-up resistors R0~Rn are connected to a 5 V power source.

The output level of the output terminal Pa of the CPU 200 is normally set at low (L) level. Therefore, the signals from the sensors Sn are input to the expansion I/O port 204 without being inverted by the exclusive-OR gates En. Thus, when port diagnosis is not being executed, the signals generated by the sensors S1~Sn can be accurately input to the expansion I/O port 204.

When the expansion I/O port 204 is being diagnosed, the level of the signals output from the output terminal Pa of the CPU 200 changes from low (L) level to high (H) level, or from high (H) level to low (L) level. Thus, the level of the signal input to the input terminal Pn is changed from high (H) to low (L), or low (L) to high (H) by the exclusive-OR gate En regardless of the input logic from the sensors Sn.

For example, when determining whether or not the input terminal P1 is normal, the level of the signal output by the output terminal Pa of the CPU 200 is changed, and the level of the signal input to the CPU 200 from the input terminal P1 is checked. Alternatively, a check may be made to determine whether or not the aforesaid input signal has changed relative to the aforesaid output signal.

Figure 1:
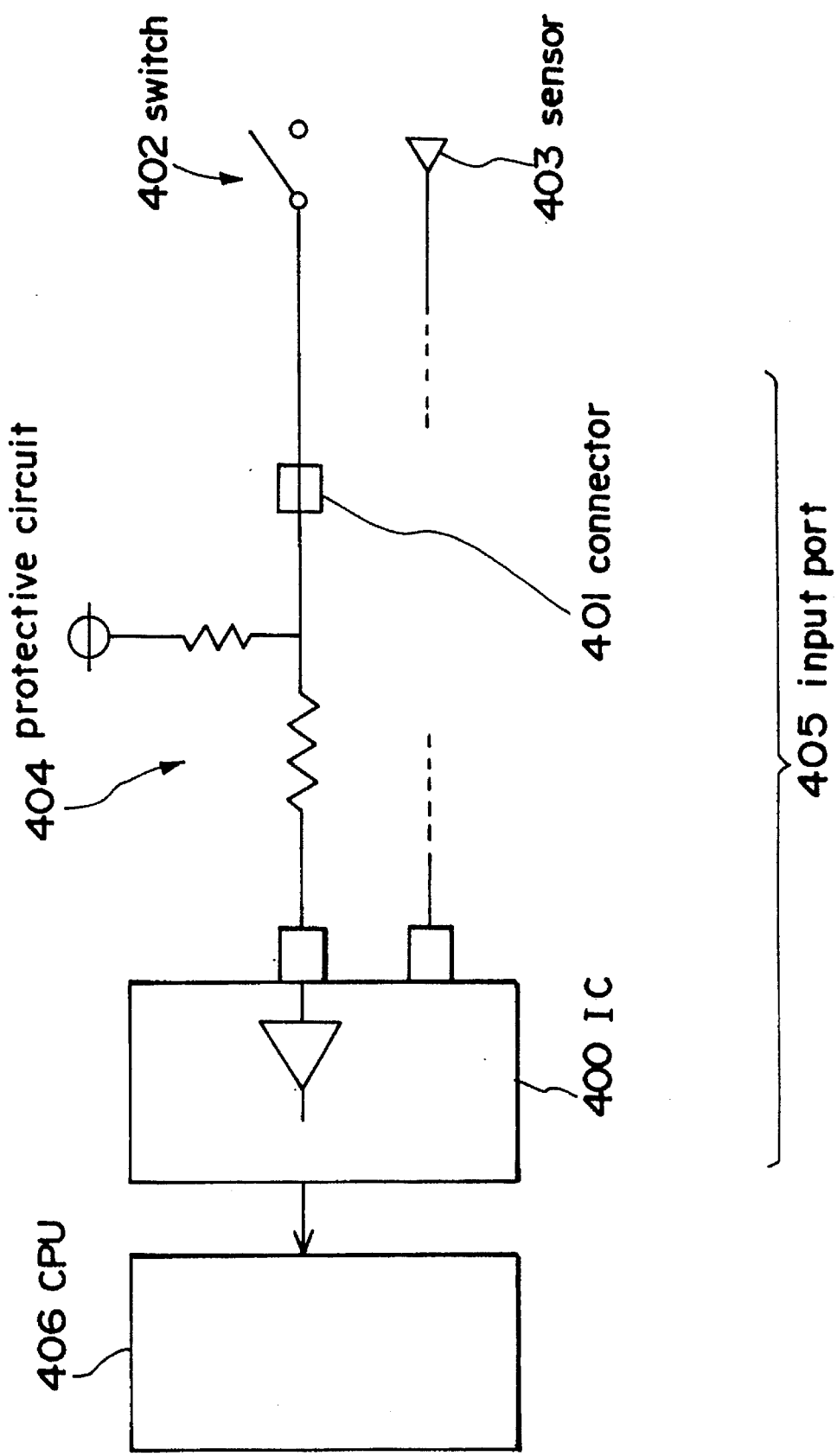
FIG. 1 is an illustration showing the construction of an input port.
Figure 2:
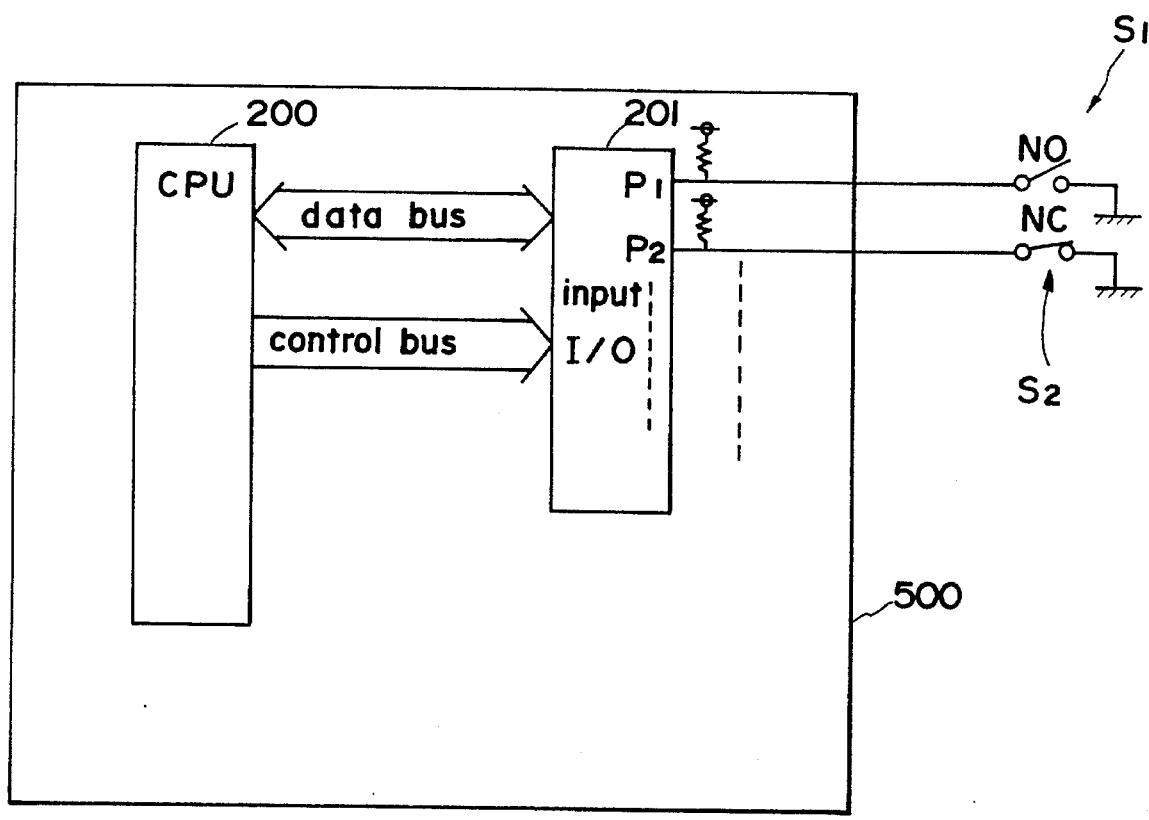
FIG. 2 is an illustration showing the construction of the peripheral connections of an expansion I/O port of a conventional copying apparatus
Figure 3:
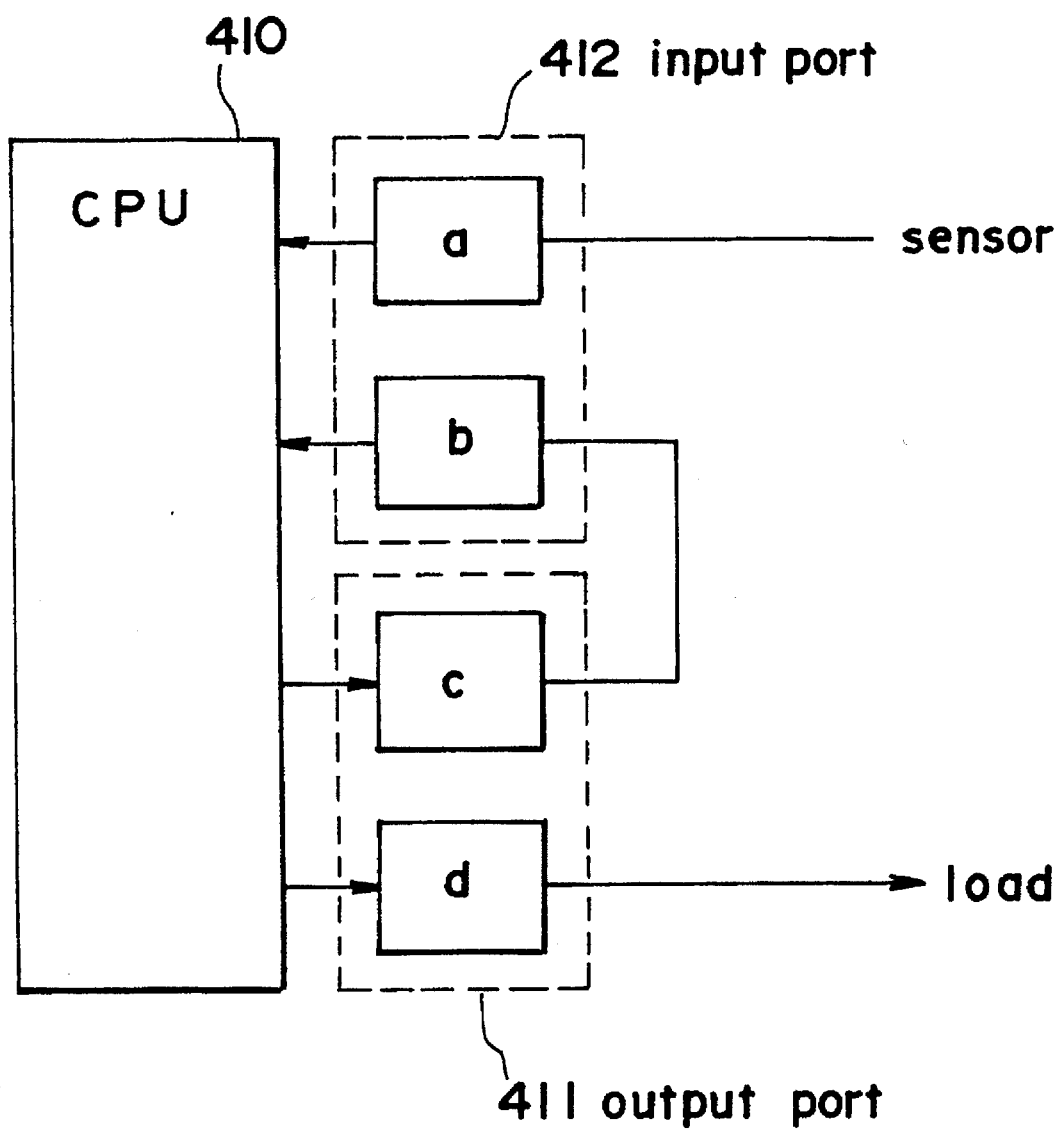
FIG. 3 is an illustration showing the construction of other peripheral connections of an expansion I/O port of a conventional apparatus.
Figure 8:
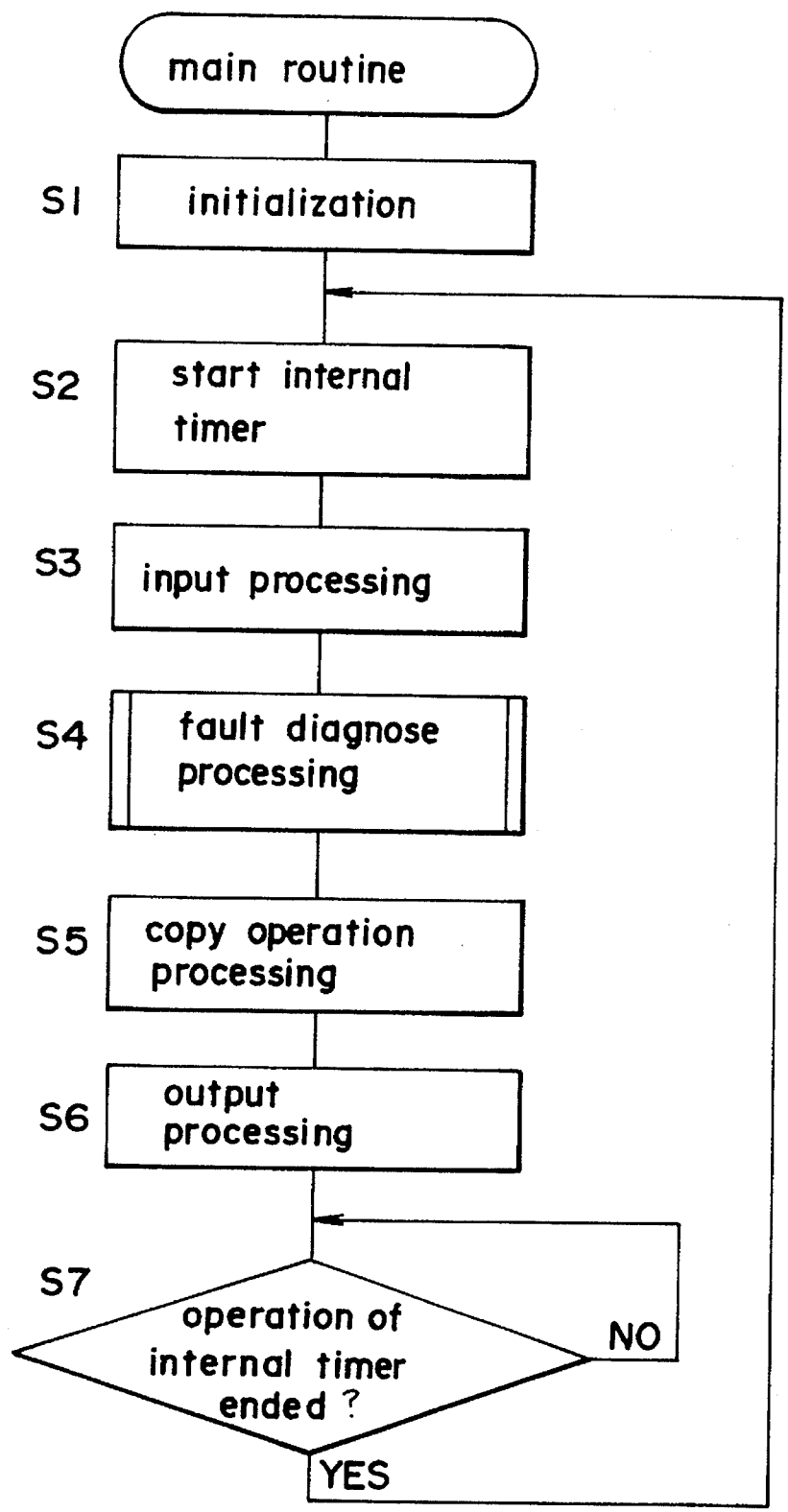
FIG. 8 is a flow chart showing the main routine executed by the CPU 200 shown in FIG. 6.

FIG. 8 is a flow chart of the main routine for controls executed by the CPU 200 shown in FIG. 3. Before describing the flow chart, we shall define the terms ON-edge and OFF-edge. In the following description, the term "ON-edge" is defined as the switching of the switches, sensors, signals and the like from the OFF state to the ON state, whereas the term "OFF-edge" is defined as the switching of said switches, sensors, signals and the like from the ON state to the OFF state. The flow chart of FIG. 8 is described hereinafter.

When the power source of the image forming apparatus of FIG. 4 is turned ON, all settings are initialized in step S1. In step S2, the internal timer of the CPU 200 is started, to manage the time of one routine necessary for the controls described below.

In step S3, input from the operation panel and various sensors are received and processed. In step S4, controls are executed to diagnose the expansion I/O port 204 and diagnose the sensor Sn. Details of the aforesaid diagnoses follows later.

In step S5, continuous copy operation processing is executed from copy start to finish. In step S6, necessary information is displayed on the LCD 117. In step S7, a check is made to determine whether or not the previously mentioned internal timer has ended, and if so, the routine returns to step S2. Thereafter, the processes of step S2 through S7 are repeated.

Figure 9:
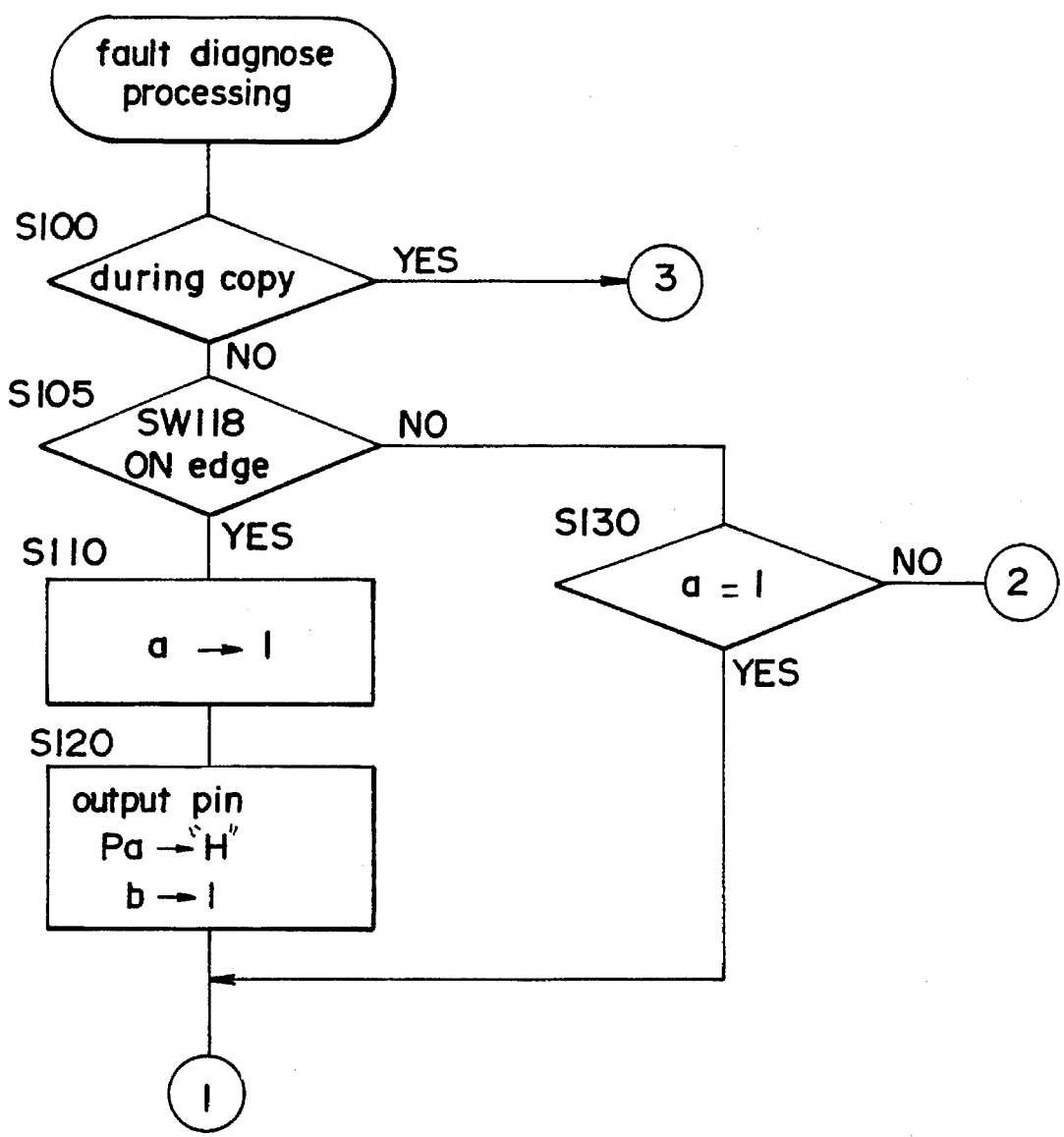
FIG. 9 is a partial flow chart showing the fault diagnosis routine of FIG. 8.
Figure 10:
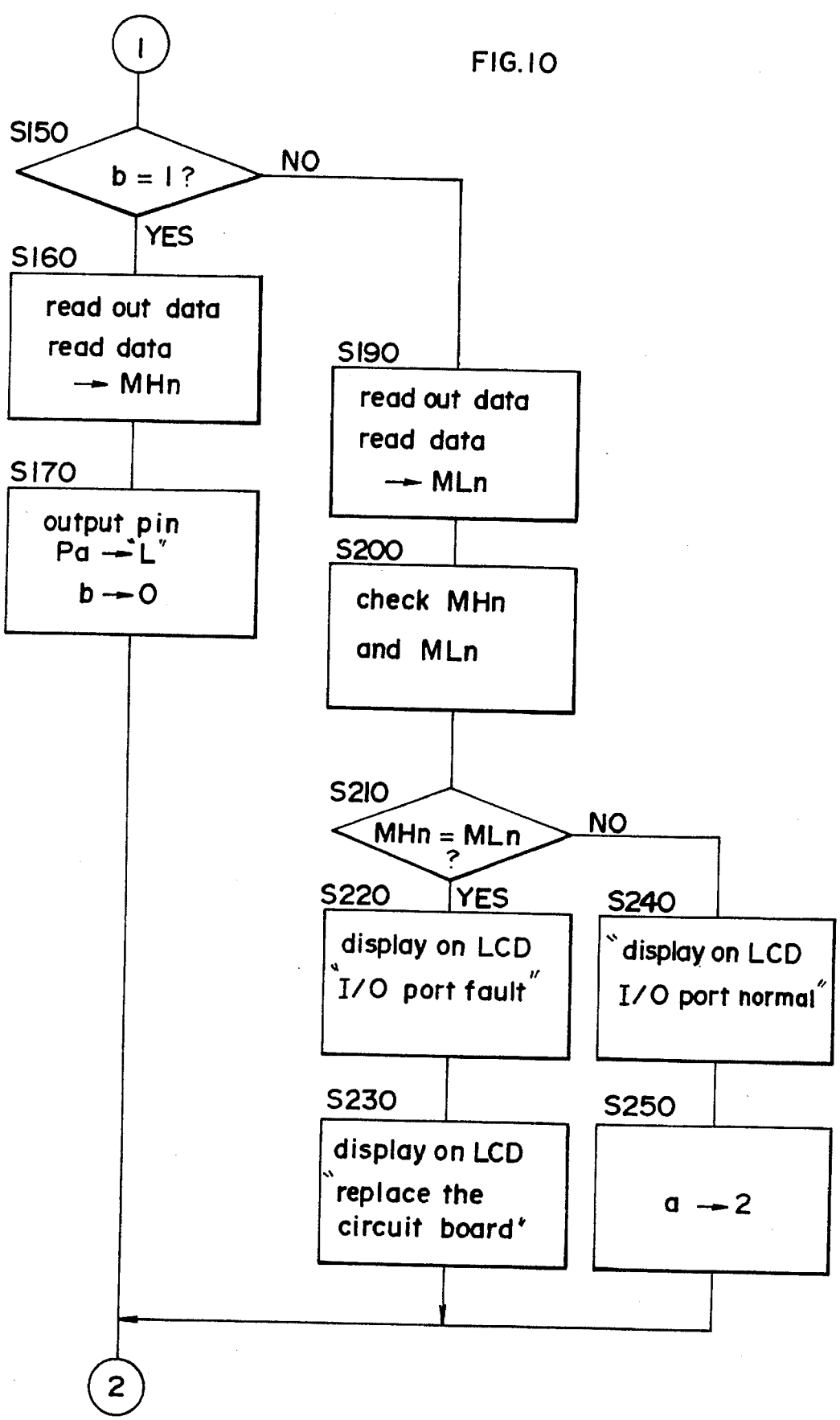
FIG. 10 is another part of the flow chart showing the fault diagnosis routine of FIG. 8.
Figure 11:
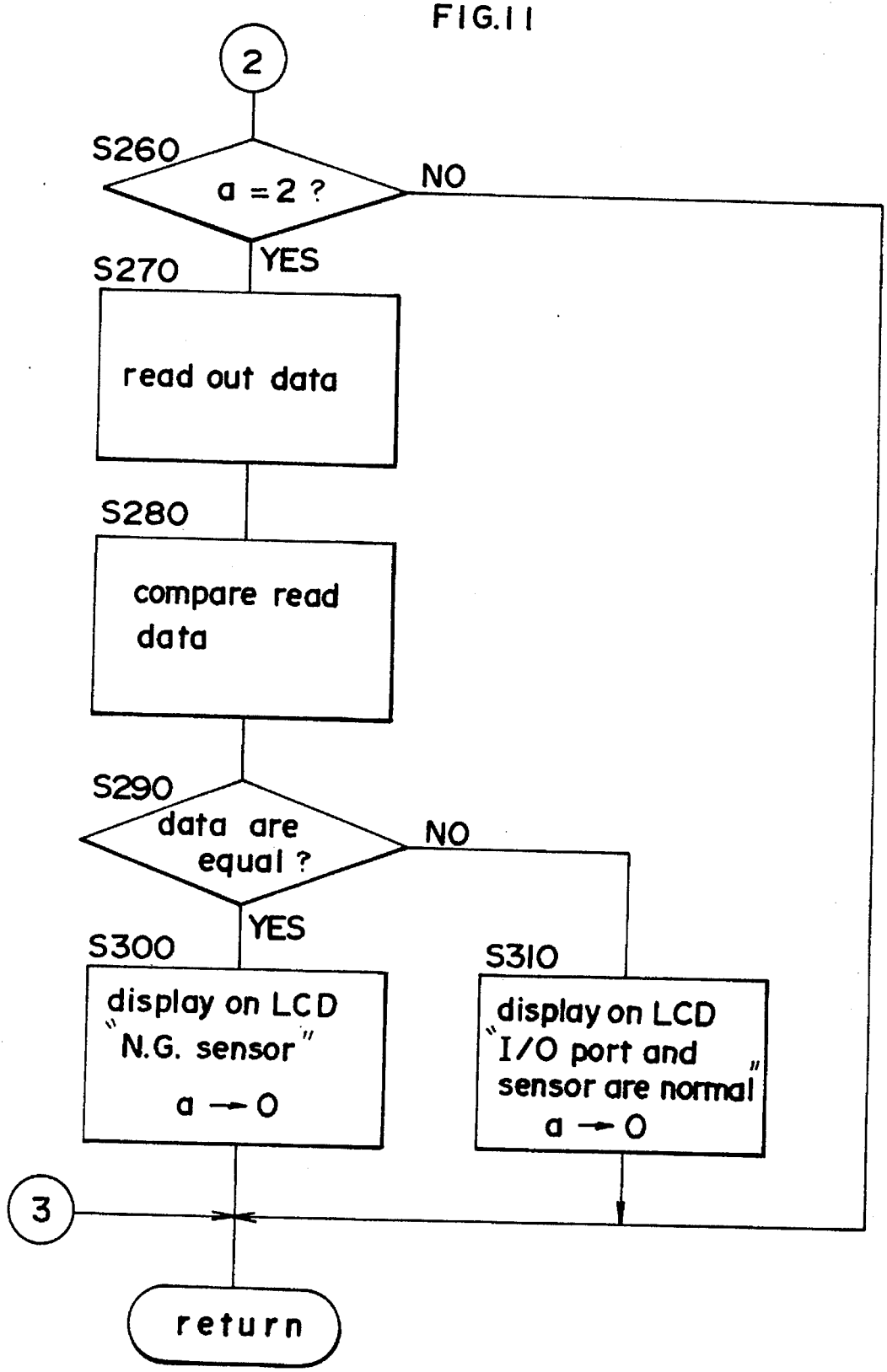
FIG. 11 is still another part of the flow chart showing the fault diagnosis routine of FIG. 8.

FIGS. 9 through 11 show a flow chart of the fault diagnosing process of FIG. 8. The flow chart shown in FIGS. 9–11 is described below.

In step S100, a determination is made as to whether or not the image forming apparatus is currently making copies. If the apparatus is making on-going copies, the routine returns. If the apparatus is not currently making copies, a determination is made in step S105 as to whether or not the I/O diagnostic key 118 on the operation panel is ON-edge. When the I/O diagnostic key 118 is ON-edge, the value of the flag a is set at [1] in step S110, and subsequently the level of the output signal of the output terminal Pa is set at high (H) level in step S120, flag b is set at [1], and the routine advances to step S150.

On the other hand, when the I/O diagnostic key 118 is not ON-edge, the value of flag a is checked in step S130. When the value of flag a is [1], the routine advances to step S150, whereas when the value of flag a is not [1], the routine advances to step S260.

In step S150, the value of flag b is checked. When the value of flag b is [1], in step S160 the level of the signal transmitted to the input terminal Pn of the expansion I/O port 204 is read by the CPU 200 as data, and said data are stored in memory area MHn of RAM 201. Then, in step S170, the level of the signal output from the output terminal Pa of the CPU 200 is set at low (L) level, the value of flag b is set at [0], and the routine advances to step S260.

On the other hand, when the value of flag b is not [1] in step S150, the routine advances to step S190, the level of the signal transmitted to the input terminal Pn of the expansion I/O port 204 is read as data, said data are stored in memory area MLn of RAM 201, and a data check is made in step S200 of the data stored in the memory area MHn and memory area MLn. In step S210, a check is made to determine whether or not the data stored in the memory areas MHn and MLn are equal. If at least one input terminal has equal equivalent data, the expansion I/O port is deemed to have failed, and in step S220 the LCD 117 displays a message alerting that the expansion I/O port 204 has faulted. Then, in step S230, the LCD 117 displays a message to replace the circuit board, and subsequently the routine advances to step S260.

On the other hand, when the equivalent data stored in the memory areas MHn and MLn all do not agree from 1 to N, a message is displayed indicating the expansion I/O port is normal, the value of the flag a is set at 2 in step S250, and the routine advances to step S260.

Then, in step S260, a check is made to determine whether or not the value of flag a is [2]. When the value of flag a is not [2], the routine directly returns.

When, however, the value of flag a is [2], the level of the signal transmitted to the input terminal Pn of the expansion I/O port 204 is read as data in step S270. In step S280, the various data read in step S270 are compared to the data (logical data of each terminal input during normal standby time) previously stored in predetermined memory areas of RAM 201. In step S290, a check is made to determine whether or not the data are inequalities. When the data are unequal, the sensors connected to the input terminal of said unequal data are displayed on the LCD 117, the failed sensors are replaced by a service person or the like, and the value of flag a is reset at [0]. When the equivalent data are not unequal in step S290, in step S310 a message is displayed on the LCD 117 that the expansion I/O port 204 and sensors are normal, and thereafter the value of flag a is reset at [0].

Although the first embodiment has been described in terms of a fault diagnosing device for an input port provided with a plurality of input terminals, it is to be noted that input port diagnosis can be accomplished even when said input port is provided with only a single input terminal, regardless of the input logic from the sensors.

Further, service persons may be alerted not only by displaying the results of diagnosis on the operation panel, but also by generating an audible signal or audible alarm.

Although an exclusive-OR gate was used in the example of the first embodiment, it is to be understood that the present invention is not limited to this arrangement inasmuch as elements or circuits accomplishing logic inversion may be alternatively used.

Second Embodiment

Although an exclusive-OR gate was used in the first embodiment, inexpensive diodes are used instead of said exclusive-OR gate in the present embodiment, so as to allow construction of either an input port fault diagnosing device or an output port fault diagnosing device. The second embodiment is described in terms of an output port fault diagnosing device using diodes. The essential construction of the image forming apparatus of the second embodiment is identical to that of the first embodiment shown in FIG. 4. The CPU peripheral circuit construction is similarly identical to that of the first embodiment shown in FIG. 6.

Figure 12:
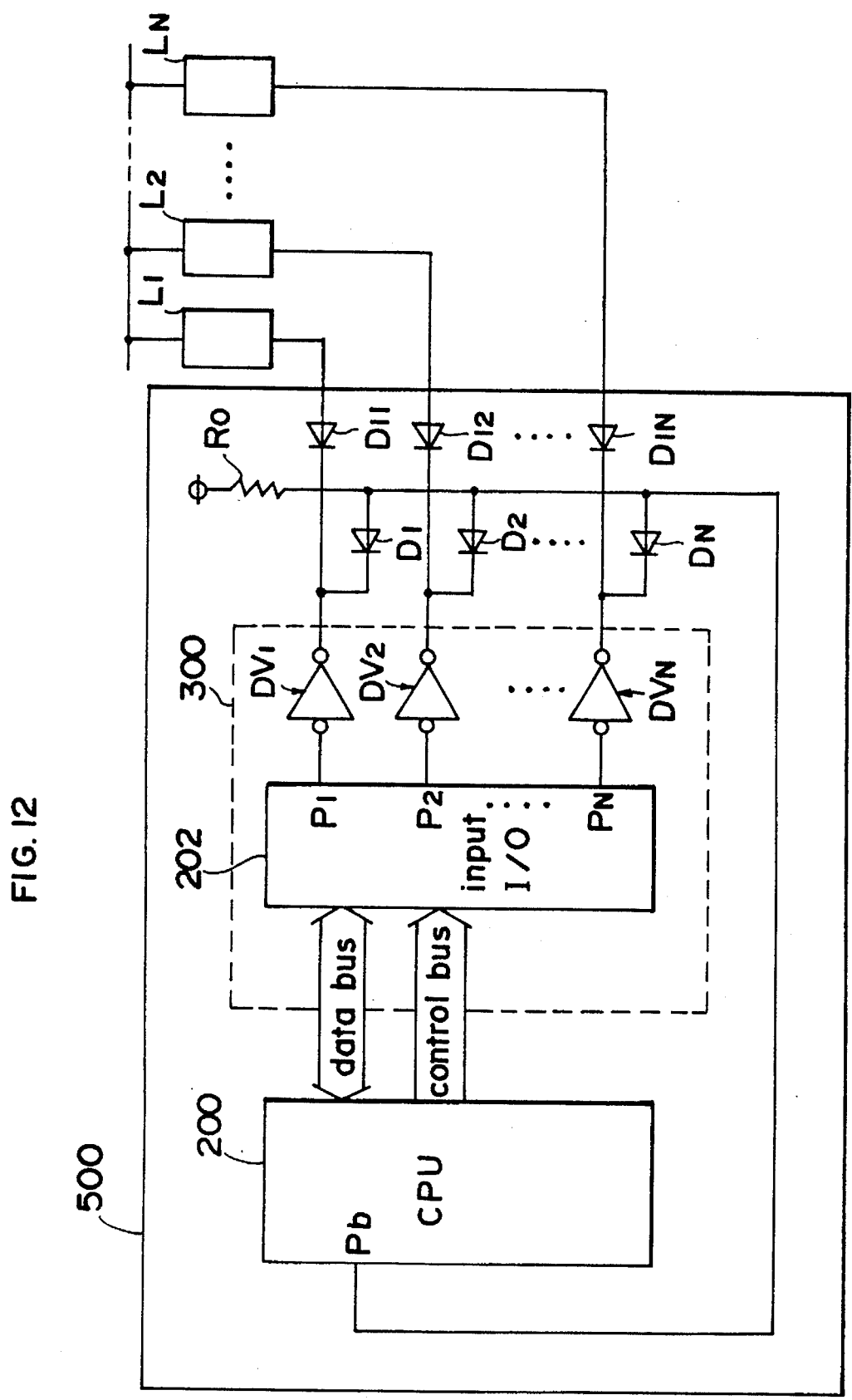
FIG. 12 shows the construction of the output port diagnosing circuit for diagnosing the expansion I/O port 202 used for output shown in FIG. 6.

An example of an output port fault diagnosing circuit for diagnosing the expansion I/O port 202 for output is shown in FIG. 12. This circuit comprises a CPU 200, output expansion I/O port 202, and a plurality of loads L1 through Ln (where N≧2). The output port fault diagnosing circuit is described in detail hereinafter with reference to the accompanying drawings.

The CPU 200 and the expansion I/O port 202 are mutually connected via a data bus and a control bus. Driver DVn is connected to the output terminal Pn (where n=1, 2, . . . , N) of the expansion I/O port 202. The driver DVn is a circuit for switching ON and OFF the load Ln in accordance with the signals output from the output terminal Pn of the expansion I/O port 202. In the second embodiment, the circuit comprising the expansion I/O port 202 and drivers DV1 through DVn is defined as the control drive circuit 300.

The load Ln connected to the 24 volt power source is connected to the driver DVn via the diode D1n. The diode D1n is connected with the anode on the load Ln side and the cathode on the control drive circuit 300 side. When the level of the signal output form the output terminal Pn of the expansion I/O port 202 is low (L) level, the driver DVn is turned ON.

A diode Dn is connected to the driver DVn in parallel to the diode D1n which is connected to the load. The diodes D1 through Dn are connected to one input terminal Pb of the CPU 200. The diodes D1 through Dn are connected with the cathode on the control drive circuit 300 side and the anode on the CPU 200 side. The diodes D1 through Dn operate to transmit signals output from the output terminals P1 through Pn to the input terminal Pb, further accurately transmit signals output from the output terminal Pn to the load Ln. For example, when a signal to drive the load L1 is output from the output terminal P1, the diodes D2 through Dn operate to prevent the transmission of said signal to the loads L2 through Ln, respectively.

Each anode of the diodes D1 through Dn are connected to pull-up resistor R0 which is connected to a 5 V power source. The level of the signals output from the output terminals P1 through Pn are normally set at high (H) level. Thus, the signals input to the input terminal Pb is also high (H) level.

For example, when the output signal level from the output terminal P1 changes from high (H) level to low (L) level, the diode D1 becomes conductive, and a low (L) level signal passes therethrough. Since, at this time the diodes D2 through Dn are non-conductive, the signals input to the input terminal Pb is changed to a low (L) level signal in accordance with the change of the output signal level from the output terminal P1. Thereafter, when the output signal from the output terminal P1 returns from low (L) level to high (H) level, the input signal level input to the input terminal Pb also returns from low (L) level to high (H) level.

Accordingly, when a check is made to determine whether or not the output terminal Pn is normal, the signal level output from the output terminal Pn is first changed, and the signal level input to the input terminal Pb is checked. Similarly, the input signal may be checked to determine whether or not it has changed in accordance with the aforesaid output signal.

Figure 13:
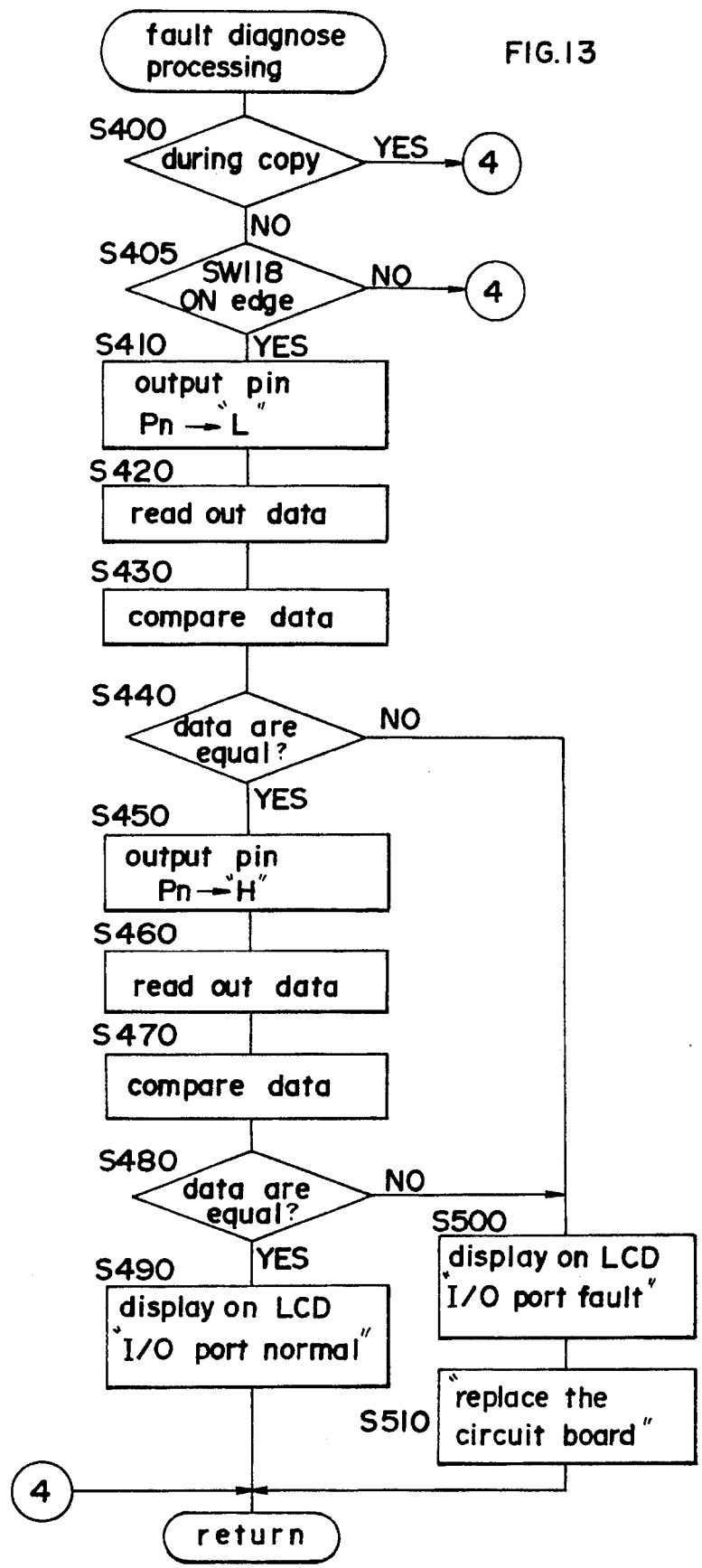
FIG. 13 is a flow chart showing the fault diagnosis routine executed by the CPU 200 in FIG. 12.

The fault diagnostic process is described in detail hereinafter. The flow chart of the main routine of controls executed by the CPU 200 in the second embodiment is identical to that of the first embodiment shown in FIG. 8. FIG. 13 is a flow chart showing the fault diagnostic process of the second embodiment.

In step S400, a check is made to determine whether or not the image forming apparatus is currently making copies, and if so, the routine returns directly. When a copy operation is not currently on-going, a check is made in step S405 to determine whether or not the I/O diagnostic key 118 of the operation panel is ON-edge. When the I/O diagnostic key 118 is ON-edge, the routine advances to step S410, whereas when the I/O diagnostic key 118 is not ON-edge, the routine returns.

In step S410, the CPU 200 transmits control signals to the expansion I/O port 202, and an output signal is generated from the object of diagnosis, i.e., the output terminal Pn, to switch ON the driver DVn. That is, the signal level of the output terminal Pn is set at low (L) level. At this time, the aforesaid control signal level is simultaneously stored in a predetermined area of RAM 201 as output data.

In step S420, the signal level input to the input terminal Pb is read as input data and stored in RAM 201, and thereafter, in step S430, said input data are compared to the aforesaid output data. A determination is made in step S440 as to whether or not said equivalent data are equal. When said data are unequal, the output terminal Pn is deemed to have failed, and the routine advances to step S500. When the aforesaid data are equal, the routine advances to step S450.

In step S450, the CPU 200 transmits control signals to the expansion I/O port 202, and an output signal is generated from the object of diagnosis, i.e., the output terminal Pn, to switch OFF the driver DVn. That is, the signal level of the output terminal Pn is set at high (H) level. At this time, the aforesaid control signal level is simultaneously stored in a predetermined area of RAM 201 as output data. In step S460, the signal level input to the input terminal Pb is read as input data and stored in RAM 201, and thereafter, in step S470, said input data are compared to the aforesaid output data. In step S480, a determination is made as to whether or not the aforesaid equivalent input data and output data are equal. If said data are unequal, the output terminal Pn is deemed to have failed, and the routine advances to step S500, whereas if said data are equal, the routine advances to step S490.

Figure 14:
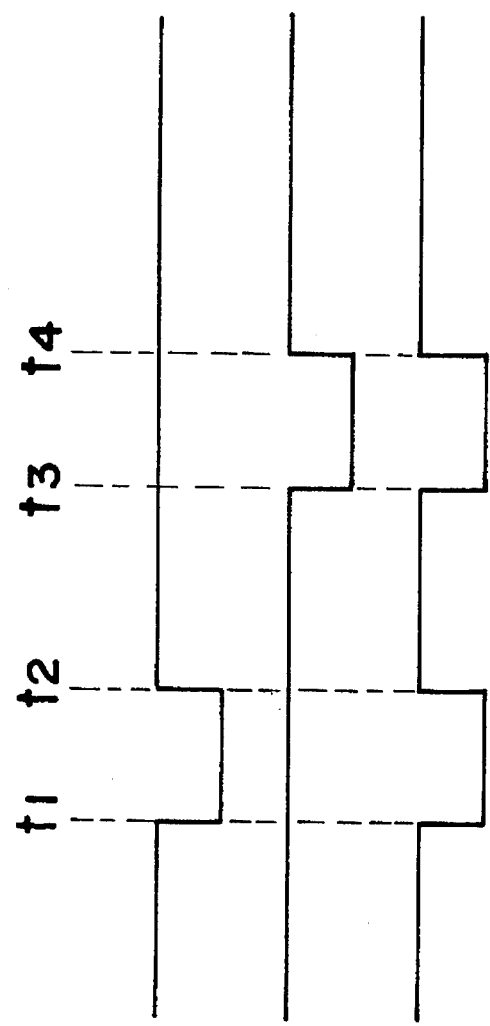
FIG. 14 is an illustration showing the changes of signal level during diagnosis by the circuit shown in FIG. 12.

FIG. 14 shows an example of a timing chart of the signal output from the output terminals P1 and P2 and signals input to the input terminal Pb when the output terminals P1 and P2 are diagnosed. The output terminal P1 is set at low (L) level output signals during the period from time t1 to time t2, and is set at high (H) level output signals after time t2. The output terminal P2 is set at low (L) level output signals during the period form time t3 to time t4, and is set at high (H) level output signals after time t4. In contrast, the signals input to the CPU 200 via the input terminal Pb becomes low (L) level during the period from time t1 to time t2 and during the period from time t3 to time t4, and subsequently become high (H) level after the aforesaid periods, respectively.

When the output terminal P1 fails, and the low (L) level output signal from the output terminal P1 is missing during the period from time t1 to time t2, the output signal enters a continuous low (L) level state.

In step S500, an expansion I/O port 202 fault message is displayed on the LCD 117, and in step S510, a message is displayed indicating circuit board replacement is required. On the other hand, in step S490, a message is displayed on the LCD 117 indicating the expansion I/O port 202 is normal.

After the diagnostic results are displayed, the series of fault diagnostic processes end, and the routine returns.

In the flow chart shown in FIG. 13, the value n is incremented each time the I/O diagnostic key 118 is depressed, so as to be capable of diagnosing each output terminal. However, construction may be such that output terminal fault diagnosis is sequential for each output terminal when the I/O diagnostic key 118 is depressed.

In the second embodiment, when any one of the loads L1 through Ln fails, the diodes D11 through D1n transmit signals input to the input terminal Pb of the CPU 200 and are not affected by faults of the loads L1 through Ln. Accordingly, when there are no abnormalities in the control drive circuit 300, the fault is deemed to lie with the loads L1 through Ln.

Third embodiment

Figure 15:
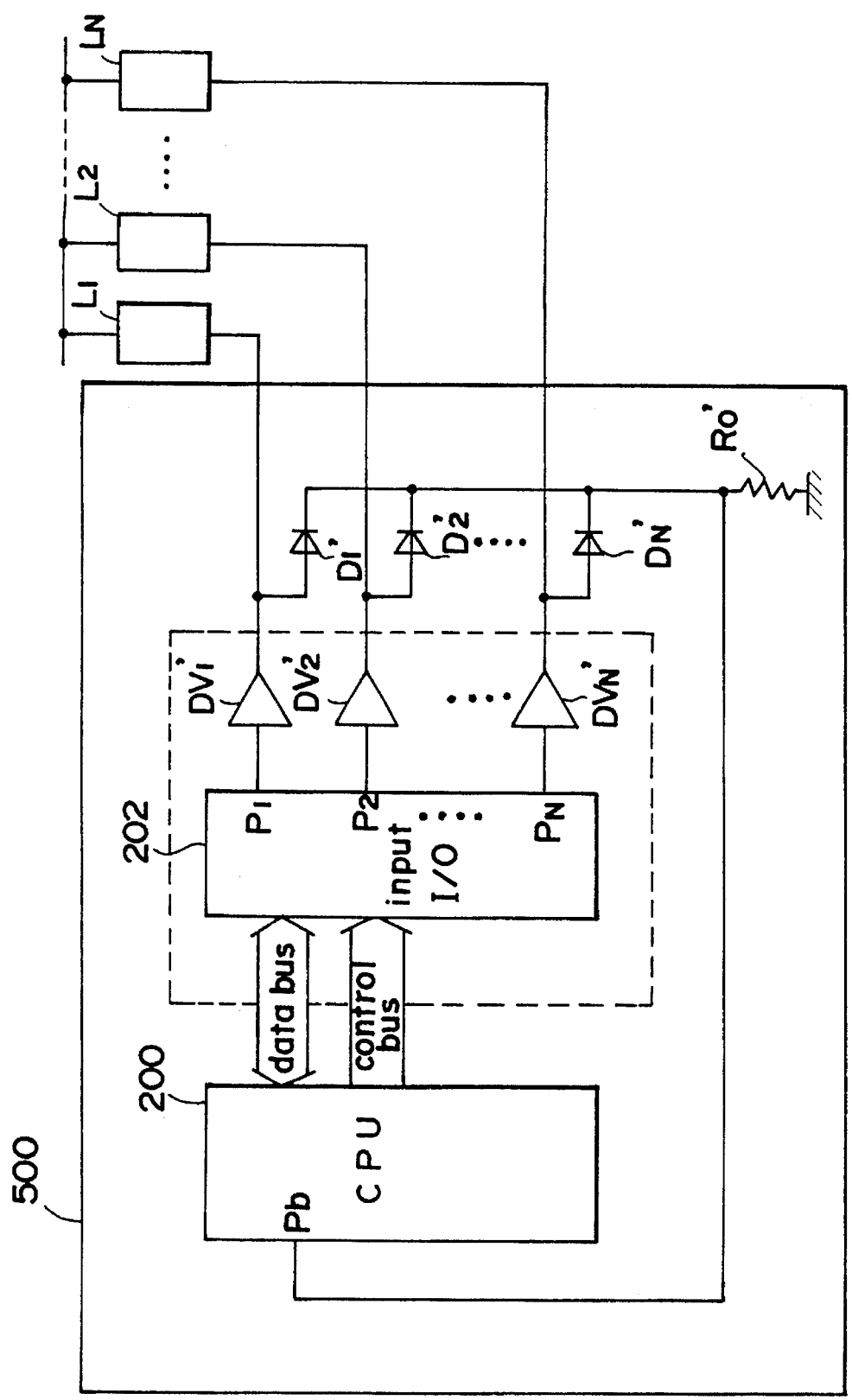
FIG. 15 shows another embodiment of the output port diagnosing device.

FIG. 15 is a circuit diagram showing another embodiment of the output port fault diagnosing device. The basic construction of the third embodiment of the port fault diagnosing device is identical to that of the second embodiment shown in FIG. 12.

The drivers DV1' through DVn' of the third embodiment are switched ON when the output signal from the expansion I/O port 202 is high (H) level. The diode Dn' is connected in parallel with the load Ln to the drivers DV1' through DVn' which are connected to the output terminal Pn. The diodes D1' through Dn' are combined and connected to the input port Pb of the CPU 200.

The diodes D1' through Dn' operate identically to the diodes D1 through Dn of the second embodiment shown in FIG. 12. The anode is connected on the control drive circuit 300 side, and the cathode is connected to the CPU 200 side.

A grounded pull-up resistor R0 is connected to the input terminal Pb in parallel with the diodes D1' through Dn'. The signal levels output from the output terminals P1 through Pn are set so as to be normally low (L) level. Thus, the signal level input to the input terminal Pb is also low (L) level.

For example, when the signal level output from the output terminal P1 changes from low (L) level to high (H) level, the diode D1' becomes conductive, and the high (H) level signal passes therethrough. Since the diodes D2' through Dn' are non-conductive at this time, the signal input to the input terminal Pb changes to high (H) level in accordance with the change in the output signal level from the output terminal P1. Thereafter, when the output signal level from the output terminal P1 returns from high (H) level to low (L) level, the level of the input signal to the input terminal Pb also returns from high (H) level to low (L) level. Accordingly, the output terminals P1 through Pn can be diagnosed in the same manner as described in the second embodiment.

Figure 16:
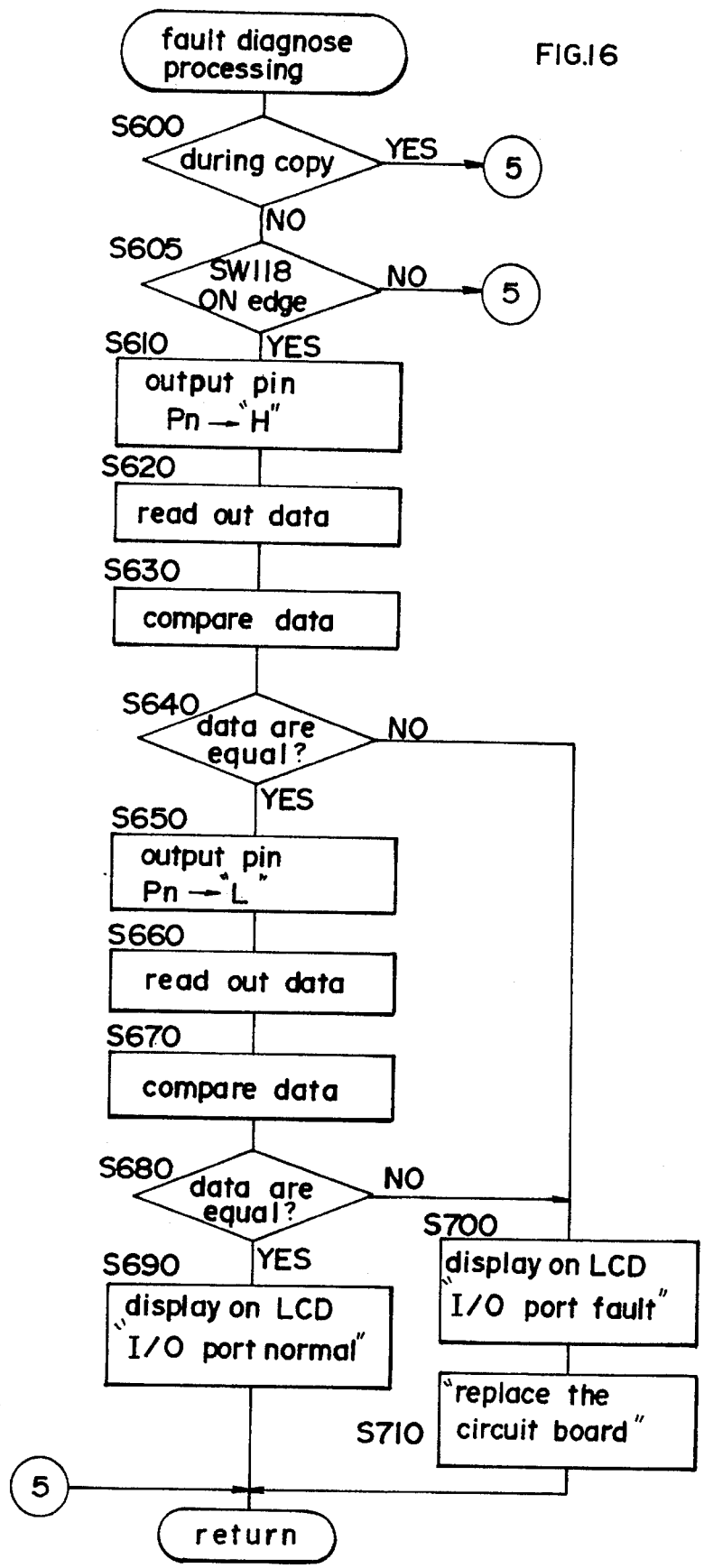
FIG. 16 is a flow chart showing the fault diagnosis routine executed by the CPU 200 in FIG. 15.

FIG. 16 is a flow chart showing the fault diagnostic process of the third embodiment. The flow chart of FIG. 16 is identical to the flow chart of the second embodiment shown in FIG. 13, with the exception of the process of step S610, which corresponds to step S410 of FIG. 13, wherein the level of the output signal from the output terminal Pn is high (H) level, and the process of step S650, which corresponds to step S450 of FIG. 13, wherein the level of the output signal from the output terminal Pn is low (L) level.

Figure 17:
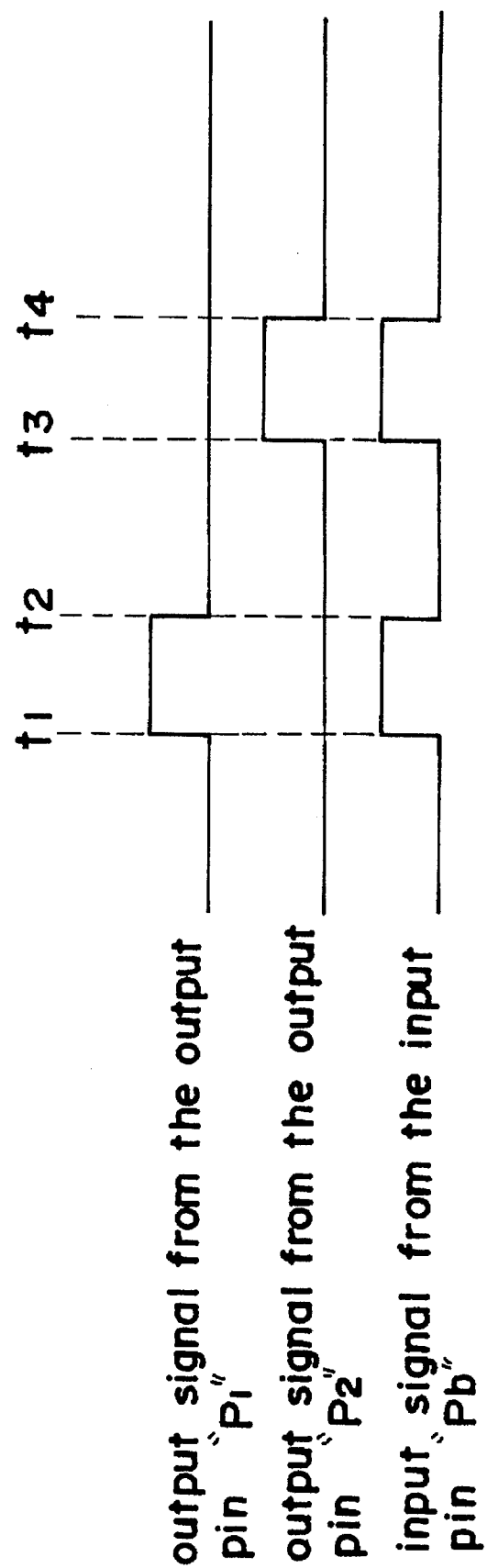
FIG. 17 is an illustration showing the changes in signal level during diagnosis by the circuit shown in FIG. 16.

FIG. 17 shows an example of a timing chart of the signal output from the output terminals P1 and P2 and signals input to the input terminal Pb when the output terminals P1 and P2 are diagnosed. The output terminal P1 is set at high (H) level output signals during the period from time t1 to time t2, and the output terminal P2 is set at high (H) level output signals during the period form time t3 to time t4. In contrast, the signals input to the CPU 200 via the input terminal Pb become high (H) level during the period from time t1 to time t2 and during the period from time t3 to time t4, and become low (L) level at other times.

When the output terminal P1 fails, and the high (H) level output signal from the output terminal P1 is missing during the period from time t1 to time t2, the output signal enters a continuous high (H) level state, as shown in FIG.

Fourth Embodiment

Figure 18:
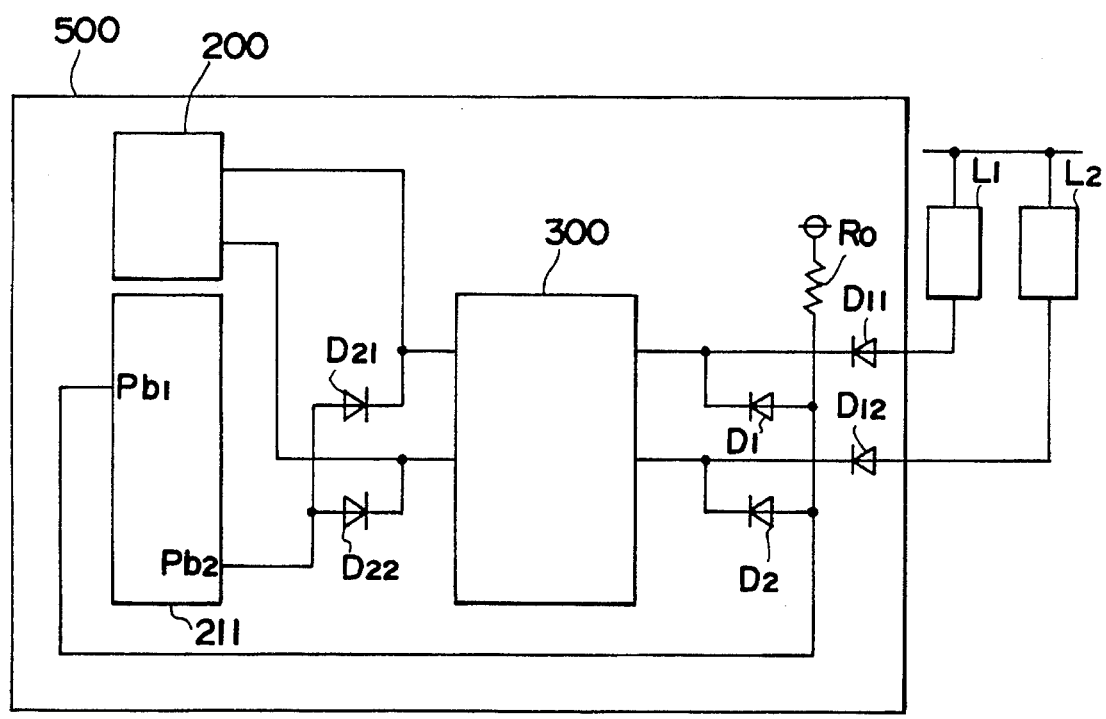
FIG. 18 shows a still further embodiment of the output port diagnosing circuit

FIG. 18 shows a still further embodiment provided with a CPU 200 for transmitting signals for drive the loads to the control drive circuit 300, and a separate CPU 210 for determining whether or not the output terminals being diagnosed are normal. A plurality of connection leads connected to the CPU 200 and the control drive circuit 300 are branched so as to connect to one input terminal Pb2 of the CPU 211 via the diodes D21 through D2n. The construction is otherwise identical to that of the second embodiment shown in FIG. 12. The fourth embodiment is described in terms of only the diodes D1 and D2 shown in the drawing for the sake of simplicity.

When fault diagnosis is executed, the CPU 200 transmits control signals to the control drive circuit 300, and signals are output from the output terminal Pn of the expansion I/O port 202 (not illustrated) to switch ON the driver DVn (not illustrated). This output signal is input to the input terminal Pb1 of the CPU 211 via the diode Dn. On the other hand, the aforesaid control signal is input to the input terminal Pb2 of the CPU 211 via the diode D2n. The CPU 211 compares the signal levels input from the input terminal Pb2 and Pb1, and determines whether or not the control drive circuit 300 is operating normally or abnormally.

Although, in the first, second, third and fourth embodiments, fault diagnosis is conducted relative to the expansion I/O port 202 and drivers DVn and DVn', if the diodes are connected to the output terminal Pn of the expansion I/O port 202 in parallel with the drivers DVn and DVn', and the output terminal Pn is connected to a single input terminal of the CPU 200 via said diodes, it is possible to detect faults among all drivers and the expansion I/O port 200.

In the second, third and fourth embodiments, the load stop state during the load test operation for fault detection applies a high voltage approaching the power source voltage of the load to the connection lead between the driver DVn and the load Ln. However, the direct application of said high voltage to the CPU 200 can be prevented by the diode Dn. Accordingly, the circuit construction is simplified since it is unnecessary to provide a new buffer or the like to reduce the voltage applied to the output port fault diagnostic circuit.

Fifth Embodiment

A fifth embodiment of the input port fault diagnosing device using diodes is described hereinafter. The essential construction of the copying apparatus is identical to that of the first embodiment shown in FIG. 4. The CPU peripheral circuit construction is similarly identical to that of the first embodiment shown in FIG. 6.

Figure 19:
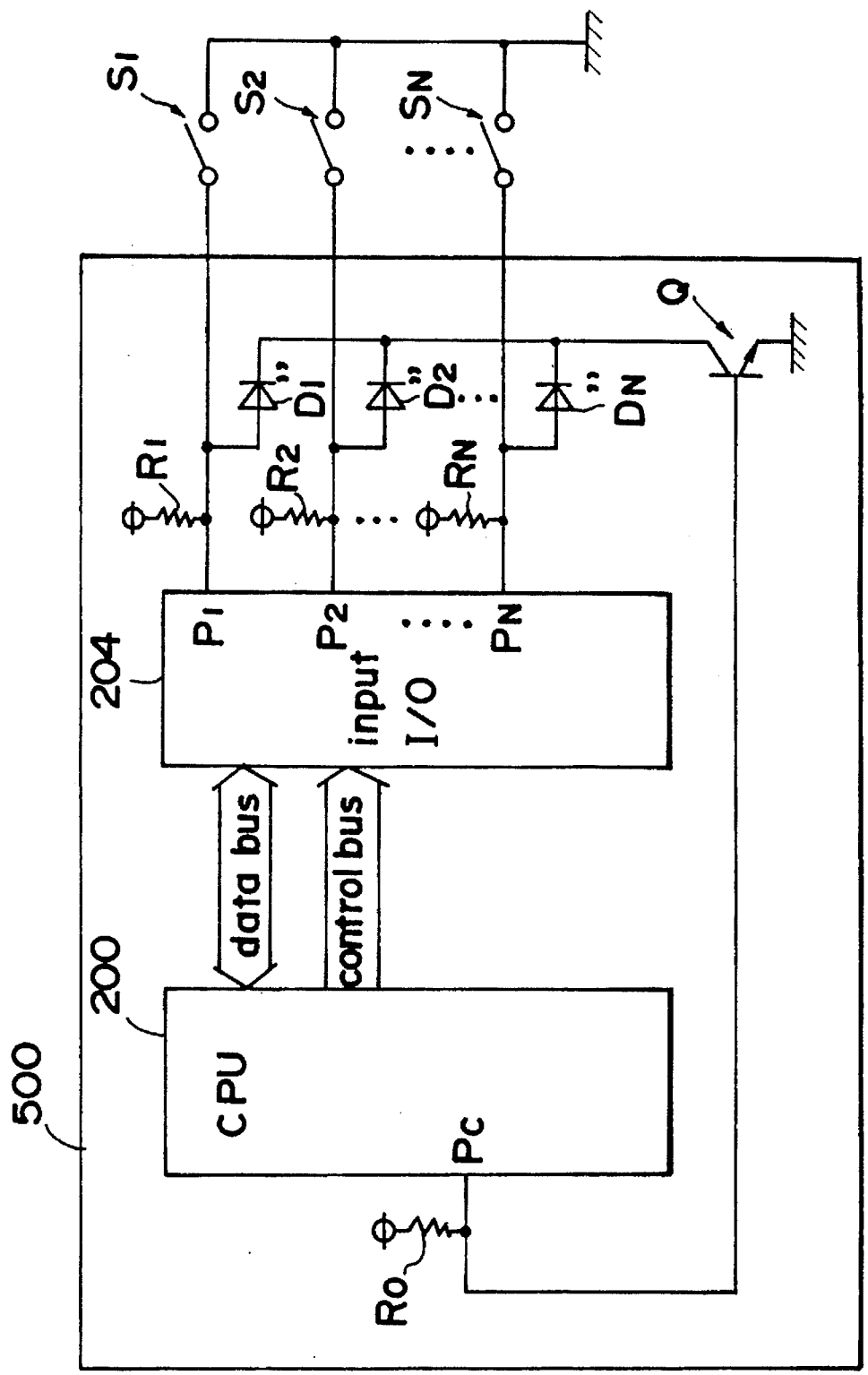
FIG. 19 shows an embodiment of the input port diagnosing device.

An example of an input port fault diagnosing circuit for diagnosing the input expansion I/O port 204 is shown in FIG. 19. This circuit comprises a CPU 200, input expansion I/O port 204, and a plurality of sensors (not illustrated) S1 through Sn (where $N \geq 2$). The input port fault diagnosing circuit is described in detail hereinafter with reference to FIG. 19.

The CPU 200 and the expansion I/O port 204 are mutually connected via a data bus and a control bus. The sensor Sn (where n=1, 2, ..., N) are connected to the input terminal Pn of the expansion I/O port 204, and the signal emitted from said sensor Sn are input to the CPU 200. The diode Dn" is connected to the input terminal Pn in parallel with the sensor Sn. The diodes D1" through Dn" are connected to the collector of the transistor Q of the negative-positive-negative (NPN) type, with the anodes connected input terminal side and the cathodes connected on the transistor Q side.

The emitter of the transistor Q is grounded, and the base is connected to the output terminal Pc of the CPU 200. A pull-up resistor R0 is connected to the input terminal Pc of the CPU 200 in parallel with the transistor Q. A pull-up resistor Rn is connected to the input terminal Pn in parallel with the transistor Q. Pull-up resistors R0 through Rn are connected to a 5 V power source.

The output level of the output terminal Pc of the CPU 200 is normally set at low (L) level. Thus, the output signal from the output terminal Pc is inverted by the transistor Q so as to become high (H) level, and a high (H) level signal is input to each of the input terminals P1 through Pn.

For example, when the sensor S1 is switched ON, a low (L) level signal is input to the input terminal P1, but since the diode D1 is non-conductive, the signal of sensor S1 is not transmitted to the input terminals P2 through Pn.

When the output signal level from the output terminal Pc changes from low (L) level to high (H) level, the output signal is inverted by the transistor Q so as to become high (H) level. Accordingly, the diodes D1 through Dn becomes conductive and the signal level input to the input terminals P1 through Pn change from high (H) level to low (L) level.

Therefore, when a check is made to determine whether or not the input terminal Pn is normal, the signal level output from the output terminal Pc is changed, and the signal level input to the CPU 200 from the input terminal Pn is checked.

The change of the aforesaid input signal relative to the aforesaid output signal may be detected.

Figure 20:
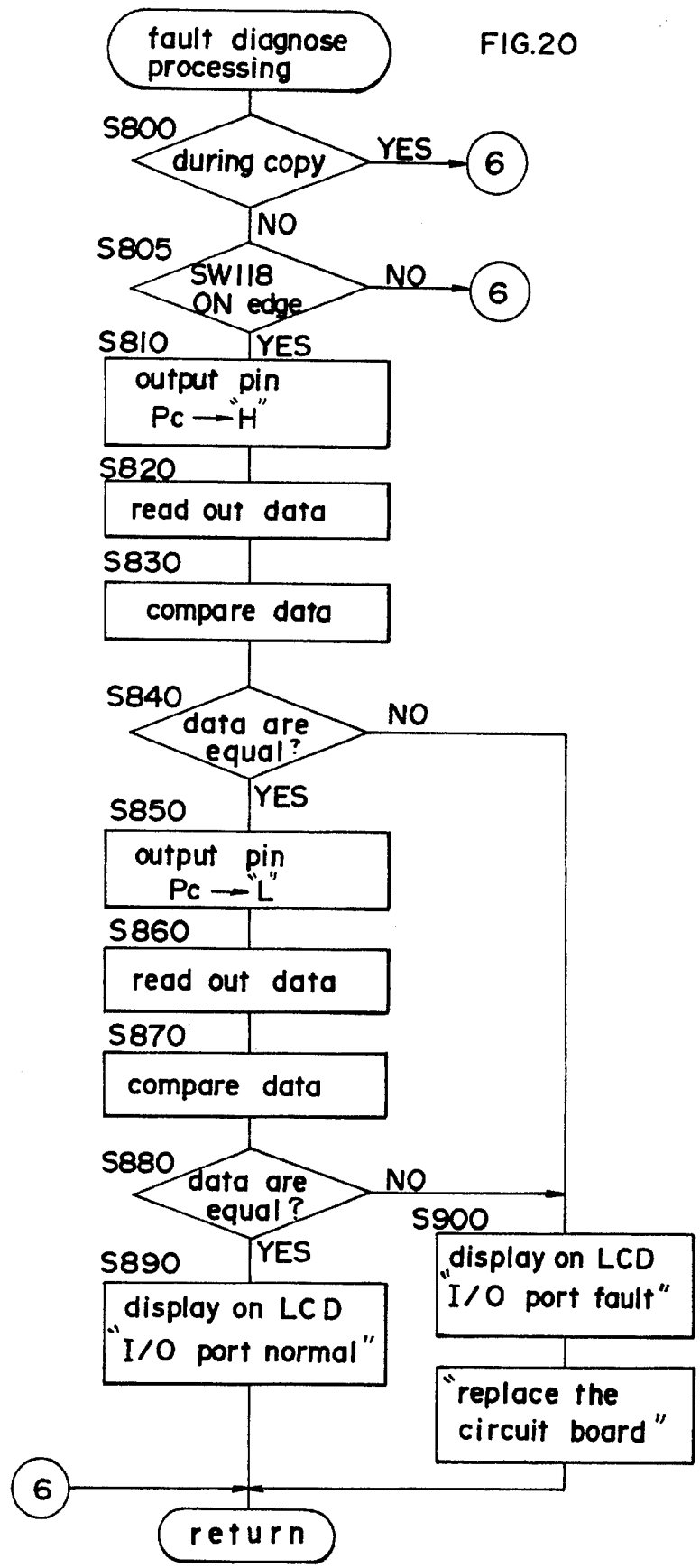
FIG. 20 is a flow chart showing the fault diagnosing routine executed by the CPU 200 in FIG. 19.

The fault diagnostic process of the fifth embodiment is described hereinafter. The flow chart of the main routine for the control executed by the CPU 200 is identical to that of the first embodiment shown in FIG. 8. FIG. 20 is a flow chart showing the fault diagnostic process.

Steps S800 to S805 are identical to steps S400 to S405 of the second embodiment shown in FIG. 13. In step S810, the CPU 200 sets the output signal level of the output terminal Pc at high (H) level, i.e., the collector voltage of the transistor Q is set at low (L) level.

Steps S820 to S830 are identical to steps S420 to S430 of FIG. 13. In step S840, the output data for the output signal level of the output terminal Pc is compared with the input data for the input signal level of the CPU 200 relative to the input signal of the input terminal Pn. If these data are equal, the input terminal Pn is deemed to have failed, and the routine advances to step S900. If the aforesaid data are unequal, the routine advances to step S850.

In step S850, the CPU 200 sets the output signal level of the output terminal Pc at low (L) level. That is, the collector voltage of the transistor Q is set at high (H) level.

Steps S860 to S870 are identical to steps S460 to S470 of FIG. 13. In step S880, the aforesaid output data and input data are compared. If the data are equal, the input terminal Pn is deemed to have failed, and the routine advances to step S900. If the data are unequal, the routine advances to step S890. Steps 890 to S910 are identical to steps S490 to S510 of FIG. 13.

Sixth Embodiment

Figure 21:
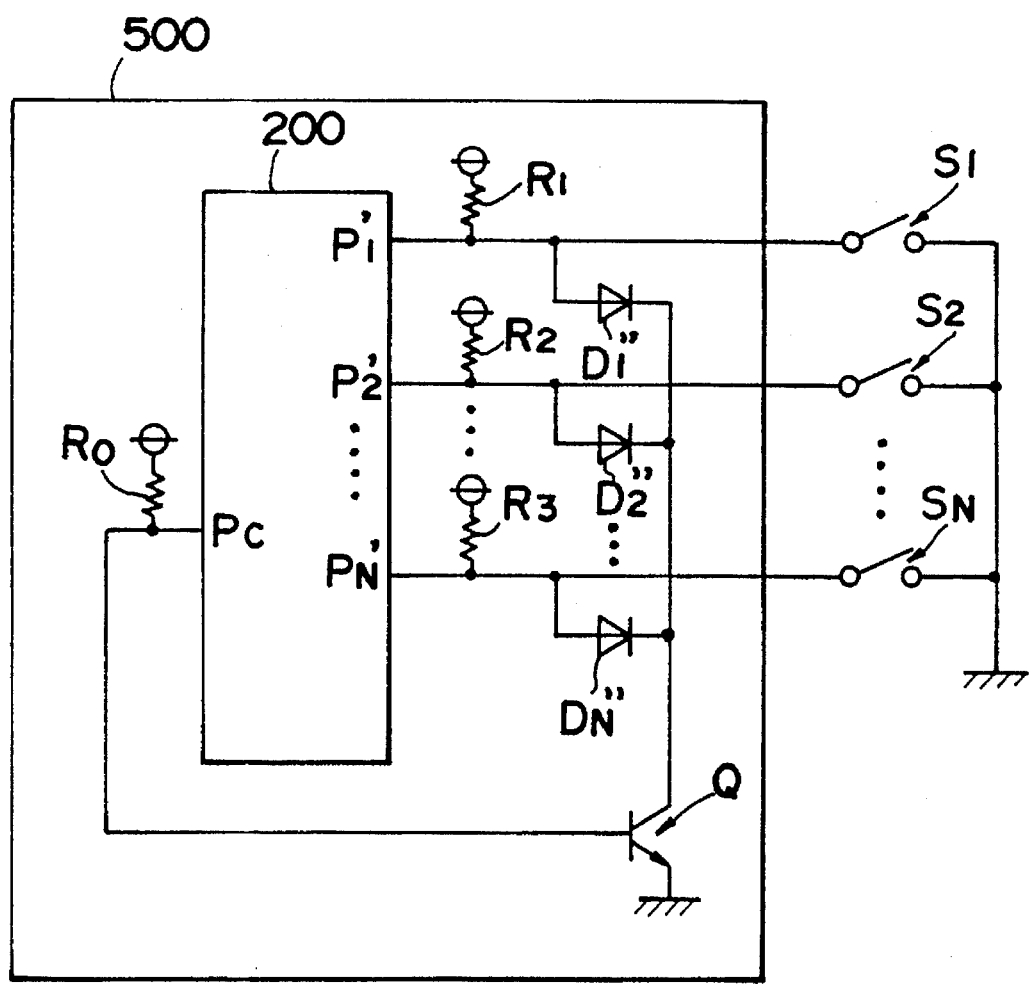
FIG. 21 shows another embodiment of the input port diagnosing device.

FIG. 21 shows another embodiment of the input port fault diagnosing device using diodes. In FIG. 19, shows a case wherein signals from the expansion I/O port 204 are input to the CPU 200, whereas FIG. 21 shows a case wherein the signals are input directly to the input terminal Pn' of the CPU 200 since the CPU 200 is provided with a built-in interface circuit.

Seventh Embodiment

Figure 22:
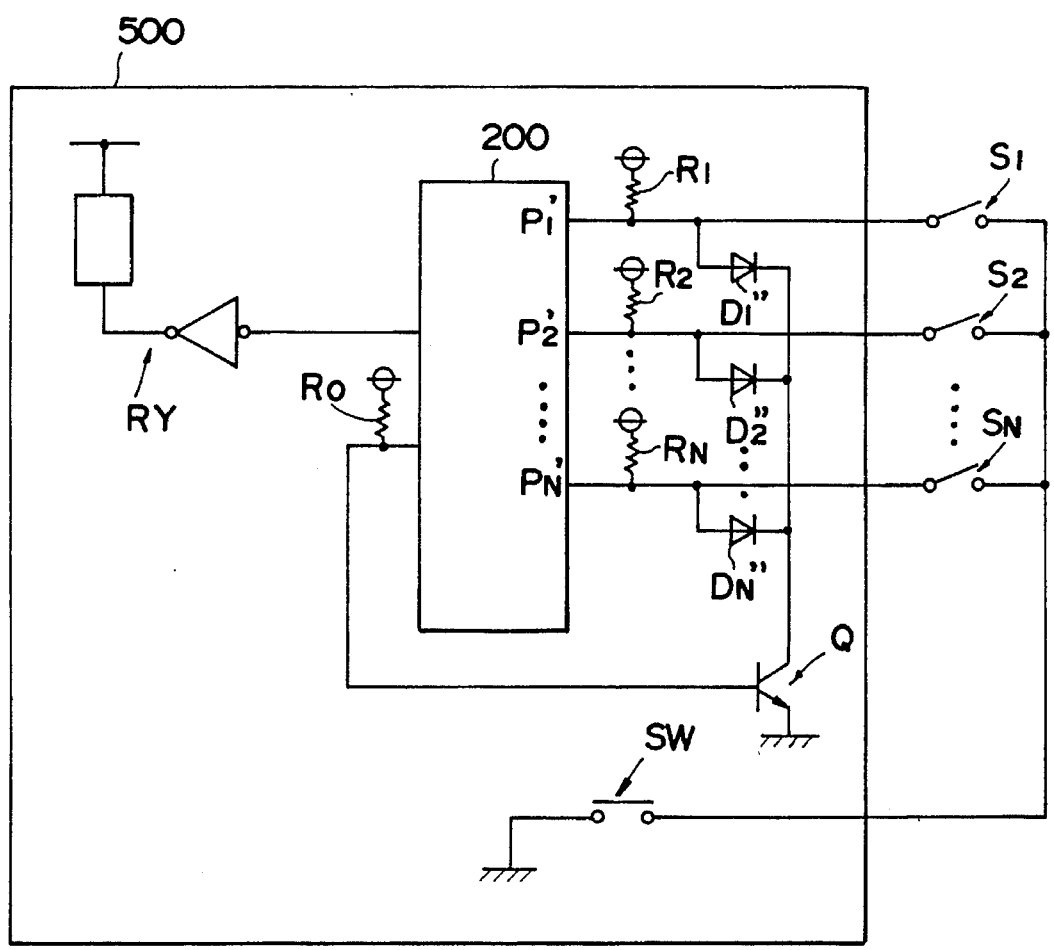
FIG. 22 shows still another embodiment of the input port diagnosing device.

FIG. 22 is a circuit diagram showing another embodiment of the input port fault diagnosing device using diodes. The circuit of FIG. 22 provides, in addition to the circuit shown in FIG. 21, the switch SW of a relay RY connected to the ground circuit of the sensors S1 through Sn. The relay RY is controlled by signal transmitted from the CPU 200 so as to switch ON and OFF the switch SW.

If the switch SW is OFF, signal input to the input terminal Pn of the CPU 200 are not affected during fault diagnosis. Thus, if the sensor Sn fails, for example, and some anomaly occurs, a sensor fault can be specifically determined by diagnosing failure of the input terminals P1' through Pn', as described in the fifth embodiment. That is, if the input terminals P1' through Pn' are determined to be normal, a sensor Sn failure may be deemed to have occurred.

The present invention possesses a construction wherein the signal output from each output terminal of the output port are combined and input to a single input terminal, and, therefore, it is unnecessary to provide input terminals for diagnosing each output terminal targeted for diagnosis, thereby improving the efficient use of I/O terminals specifically used for port fault detection. Furthermore, driver fault diagnosis may be accomplished for the drivers receiving voltage approaching the power source voltage of the load, in spite of the low cost construction.

Since each input terminal os the input port is connected in parallel to a single output terminal, it is unnecessary to provide output terminals for diagnosing each input terminal targeted for diagnosis, thereby improving the efficient use of I/O terminals specifically used for port fault detection.

Furthermore, port diagnosis can be accomplished regardless of the input signals from the sensors and like detection devices. When an input port having a plurality of input terminals is diagnosed, the efficient use of the I/O terminals specifically used for port fault detection is improved.

What is claimed is:

1. A port diagnosing device capable of diagnosing normal or abnormal ports, said ports being provided with a single input terminal and a plurality of output terminals, said port diagnosing device comprising:

a signal generating means for outputting a predetermined signal to one of said plurality of output terminals;

a feedback means for feeding back to said single input terminal the predetermined signal output from said signal generating means; and determination means for detecting changes in the level of the predetermined signal as fed back to said single input terminal in correspondence to changes in the level of said predetermined signal as output from said signal generating means, and determining the normal or abnormal operation of said one of said plurality of output terminals.

2. The port diagnosing device according to claim 1, wherein said feedback means comprises diodes and each of said plurality of output terminals is connected with any one of said diodes.

3. The port diagnosing device according to claim 2, wherein said any one of said diodes operates to transmit an output signal from said one of said plurality of output terminals to said single input terminal, and to prevent the transmission of an output signal from another output terminal.

4. The port diagnosing device according to claim 1, wherein said determination means determines the normal or abnormal operation of each of said plurality of output terminals.

5. A port diagnosing device capable of diagnosing normal or abnormal ports, said ports being provided with a single output terminal and a plurality of input terminals, said port diagnosing device comprising:

a signal generating means for generating a predetermined signal to said single output terminal;

a feedback means for feeding back to one of the plurality of input terminals the predetermined signal output from said signal generating means; and a determination means for detecting changes in the level of signals fed back to said one of said plurality of input terminals in accordance with changes in the level of said predetermined signals, and determining the normal or abnormal operation of said single output terminal.

6. The port diagnosing device according to claim 5, wherein said feedback means comprises diodes, and each of said plurality of input terminals is connected with any one of said diodes.

7. The port diagnosing device according to claim 6, wherein said any one of said diodes operates to transmit an output signal from said single output terminal to one of said plurality of input terminals, and to prevent the transmission of an output signal from another input terminal.

8. The port diagnosing device according to claim 5, wherein said determination means determines the normal or abnormal operation of each of said plurality of input terminals.

9. A port diagnosing device capable of diagnosing normal or abnormal ports comprising:

an output terminal for outputting a predetermined signal;

signal generating means for generating the predetermined signal to said output terminal;

an exclusive-OR circuit including first and second input terminals and output terminal, said first input terminal receiving an input signal from a sensor and the second input terminal receiving the predetermined signal fed back from a port to be diagnosed, and said output terminal outputting an exclusive signal to the port to be diagnosed based on the predetermined signal and a signal fed back from the first input terminal; and a determination means for detecting changes in the level of the signals inputted to said second input terminal in accordance with changes in the level of said predetermined signal, and determining the normal or abnormal operation of said second input terminal.

\* \* \* \* \*

UNITED STATES PATENT AND TRADEMARK OFFICE
CERTIFICATE OF CORRECTION

PATENT NO. : 5,546,404
DATED : August 13, 1996
INVENTOR(S) : Kenichi Takahashi, et al.

It is certified that error appears in the above-identified patent and that said Letters Patent is hereby corrected as shown below:

In col. 4, line 43, after "FIG." insert --4.--.

In col. 5, line 1, change "form" to --from--.

In col. 5, line 15, after "roller" insert --40.--.

In col. 8, line 63, change "form" to --from--.

In col. 11, line 43, after "FIG." insert --14.--.

In col. 13, line 65, change "os" to --of--.

In col. 14, line 52 (Claim 5, last line), change "single output terminal" to --one of said plurality of input terminals--.

In col. 16, line 7 (Claim 9, last line), change "second input terminal" to --port--.

Signed and Sealed this

Twenty-eighth Day of April, 1998

*Attest:*

BRUCE LEHMAN

*Attesting Officer*        Commissioner of Patents and Trademarks